(12) United States Patent
Großmann et al.

(10) Patent No.: US 12,101,157 B2
(45) Date of Patent: Sep. 24, 2024

(54) BEAM CORRESPONDENCE INDICATION AND BITMAP FOR BEAM REPORTING FOR WIRELESS COMMUNICATIONS

(71) Applicant: Fraunhofer-Gesellschaft zur Förderung der angewandten Forschung e.V., Munich (DE)

(72) Inventors: Marcus Großmann, Erlangen (DE); Sutharshun Varatharaajan, Erlangen (DE); Markus Landmann, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 738 days.

(21) Appl. No.: 17/146,565

(22) Filed: Jan. 12, 2021

(65) Prior Publication Data
US 2021/0167837 A1 Jun. 3, 2021

Related U.S. Application Data

(63) Continuation of application No. PCT/EP2018/070189, filed on Jul. 25, 2018.

(51) Int. Cl.
*H04B 7/06* (2006.01)
*H04L 1/1607* (2023.01)
*H04W 16/28* (2009.01)

(52) U.S. Cl.
CPC ......... *H04B 7/0695* (2013.01); *H04B 7/0617* (2013.01); *H04L 1/1614* (2013.01); *H04W 16/28* (2013.01)

(58) Field of Classification Search
CPC ... H04B 7/0695; H04B 7/0617; H04L 1/1614; H04W 16/28
See application file for complete search history.

(56) References Cited

U.S. PATENT DOCUMENTS

| | | |
|---|---|---|
| 2015/0341091 A1 | 11/2015 | Park et al. |
| 2016/0021548 A1 | 1/2016 | Raghavan |
| 2016/0056941 A1 | 2/2016 | Kang et al. |

(Continued)

FOREIGN PATENT DOCUMENTS

| | | |
|---|---|---|
| CN | 101453255 A | 6/2009 |
| CN | 105122869 A | 12/2015 |

(Continued)

OTHER PUBLICATIONS

Communication dated Jul. 4, 2023, issued in application No. EP 18 746 896.2.

(Continued)

*Primary Examiner* — Shukri Taha
(74) *Attorney, Agent, or Firm* — McClure, Qualey & Rodack, LLP

(57) ABSTRACT

A user equipment, UE, for communicating with a base station, BS, in a wireless communication system is described. The UE comprises one or more antenna arrays, each antenna array having a plurality of antenna elements. The UE signals to a BS, dependent on a property of the one or more antenna arrays, whether the UE supports full beam correspondence, partial beam correspondence or no beam correspondence.

19 Claims, 14 Drawing Sheets

(56) References Cited

U.S. PATENT DOCUMENTS

| | | | |
|---|---|---|---|
| 2017/0347358 | A1 | 11/2017 | Raghavan et al. |
| 2018/0048375 | A1 | 2/2018 | Guo et al. |
| 2018/0049042 | A1 | 2/2018 | Yu et al. |
| 2018/0102827 | A1 | 4/2018 | Noh |
| 2018/0103492 | A1 | 4/2018 | Akkarakaran et al. |
| 2019/0082334 | A1* | 3/2019 | Nagaraja .............. H04B 7/088 |
| 2019/0268114 | A1* | 8/2019 | Kang ................. H04W 72/04 |
| 2019/0281587 | A1* | 9/2019 | Zhang ............... H04W 72/23 |
| 2020/0154409 | A1* | 5/2020 | Kang ............... H04B 7/0408 |
| 2021/0160853 | A1* | 5/2021 | Gao ................ H04B 7/0695 |

FOREIGN PATENT DOCUMENTS

| | | |
|---|---|---|
| CN | 107113041 A | 8/2017 |
| CN | 109565805 A | 4/2019 |
| WO | 2017/095467 A1 | 6/2017 |
| WO | 2017/196612 A1 | 11/2017 |
| WO | 2018/028690 A1 | 2/2018 |

OTHER PUBLICATIONS

3GPP Technical specification 38.211, "NR; Physical channels and modulation," Version 15.2.0, May 2018.
3GPP Technical specification 38.214, "NR; Physical layer procedures for data," Version 15.2.0, May 2018.
3GPP Technical specification 38.133, "NR; Physical layer measurements," Version 15.2.0, May 2018.
3GPP Technical specification 38.215, "NR; Requirements for support of radio resource management," Version 15.2.0, May 2018.
R1-1702941, "Discussion on beam correspondence," RAN1'88, Samsung, Feb. 2017.
A. Bourdoux et al.: "Non-reciprocal transceivers in OFDM/SDMA systems: Impact and mitigation," in Proc. IEEE Radio and Wireless Conference, (RAWCON), Boston, MA, USA, Aug. 2003, pp. 183-186.
M. Guillaud et al.: "A practical method for wireless channel reciprocity exploitation through relative calibration," in Proc. International Symp. Signal Processing and Its Applications (ISSPA), Sydney, Australia, Aug. 2005, pp. 403-406.
F. Kaltenberger et al.: "Relative channel reciprocity calibration in MIMO/TDD systems," in Future Network and Mobile Summit , Florence, Italy, Jun. 2010, pp. 1-10.
C. Shepard et al.: "Argos: Practical many-antenna base stations," in Proc. ACM International Conf. Mobile computing and networking (Mobicom), Istanbul, Turkey, Aug. 2012, pp. 53-64.
R. Rogalin et al.: "Scalable synchronization and reciprocity calibration for distributed multiuser MIMO," IEEE Trans. Wireless Communications, vol. 13, No. 4, pp. 1815-1831, Apr. 2014.
J. Vieira et al.: "Reciprocity calibration methods for Massive MIMO based on antenna coupling," in Proc. IEEE Global Communications Conference (Globecom), Austin, USA, 2014, pp. 3708-3712.
International Search Report, May 16, 2019, from PCT/EP2018/070189.
Written Opinion, May 16, 2019, from PCT/EP2018/070189.
Chinese language office action dated Sep. 13, 2023, issued in application No. CN 201880097833.0.
English language translation of office action dated Sep. 13, 2023 (pp. 1-10 of attachment).
Chinese language Notice of Allowance dated Mar. 19, 2024, issued in application No. 201880097833.0.
English language translation of Notice of Allowance dated Mar. 19, 2024 (p. 1 of attachment).

\* cited by examiner

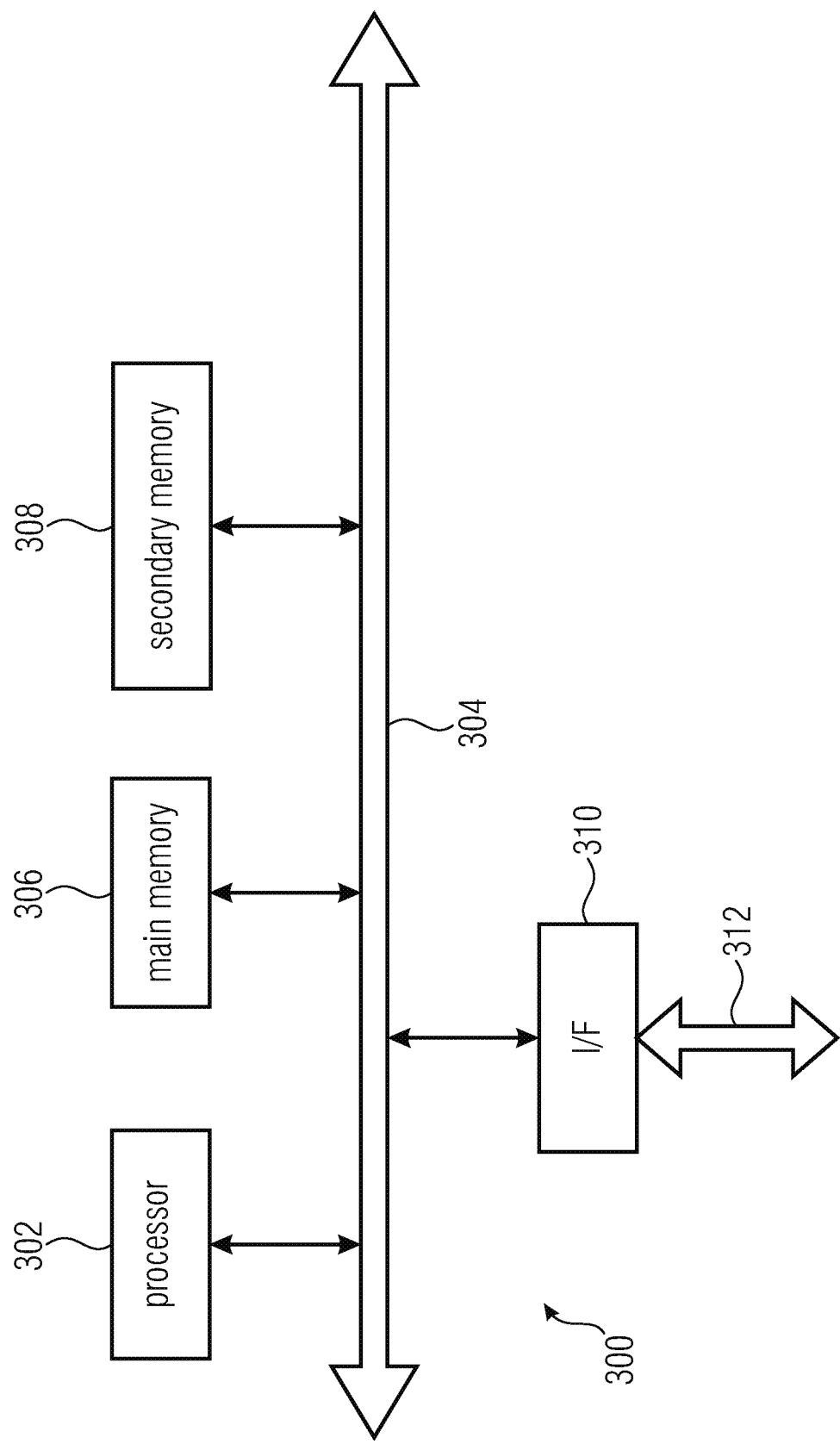

BEAM CORRESPONDENCE INDICATION AND BITMAP FOR BEAM REPORTING FOR WIRELESS COMMUNICATIONS

CROSS-REFERENCES TO RELATED APPLICATIONS

This application is a continuation of copending International Application No. PCT/EP2018/070189, filed Jul. 25, 2018, which is incorporated herein by reference in its entirety.

BACKGROUND OF THE INVENTION

The present application concerns the field of wireless communications, more specifically to a transmitter, like a base station, and a receiver, like a user equipment, UE, of a wireless communication system which employ beam correspondence when communicating with each other. Embodiments relate to a bitmap for beam reporting between a base station and a UE in a wireless communication system.

FIG. 1 is a schematic representation of an example of a terrestrial wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station, BS, refers to as gNB in 5G networks, eNB in UMTS/LTE/LTE-A/LTE-A Pro, or just BS in other mobile communication standards. A user may be a stationary device or a mobile device.

Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs". The wireless network or communication system depicted in FIG. 1 may by an heterogeneous network having two distinct overlaid networks, a network of macro cells with each macro cell including a macro base station, like base station $gNB_1$ to $gNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-advanced pro standard or the 5G or NR, new radio, standard.

In a communication system as described above, such as LTE or New Radio (5G), downlink signals convey data signals, control signals containing down link, DL, control information (DCI), and a number of reference signals or symbols (RS) used for different purposes. A gNodeB (or gNB or base station) transmits data and control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part, and used at the user equipment (UE) to obtain a channel estimate to demodulate the data or control information. The CSI-RS is transmitted with a reduced density in the time and frequency domain compared to CRS, and used at the UE for channel estimation/channel state information (CSI) acquisition. The DM-RS is transmitted only in a bandwidth part of the respective PDSCH and used by the UE for data demodulation. For signal precoding at the gNB, several CSI-RS reporting mechanism were introduced such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam-direction and beam-width. For beamformed/precoded UE-specific or non-UE-specific CSI-RS, a beam-forming operation is applied over a single- or multiple antenna ports to have several narrow beams with high gain in different directions and therefore, no cell-wide coverage.

Downlink, DL, signals may convey data signals, control signals containing DL control information, for example the DCI, and a number of reference signals, RS, which are used for different purposes. A gNB transmits data information through the above-mentioned physical downlink shared channel, PDSCH, and control information, like the DCI, through the physical downlink control channel, PDCCH, or the enhanced PDCCH, ePDCCH. Moreover, the DL signal (s) of the gNB may contain one or multiple types of RSs including, for example, a common RS, CRS, as used in LTE systems, a channel state information RS, CSI-RS, a demodulation RS, DM-RS, a phase tracking RS, PT-RS, or a synchronization signal block, SSB, for example in a 5G NR system, which comprises a primary synchronization signal, a secondary synchronization signal and a physical broadcast channel, PBCH. The CRS is transmitted over a DL system bandwidth part and is used at the UE to obtain a channel estimate to demodulate the data or control information. The CSI-RS, when compared to the CRS, is transmitted with a reduced density in the time and frequency domains and is used at the UE for a channel estimation or for the acquisition of channel state information, CSI, as is described, for example, in reference [1]. The DM-RS is transmitted only in a bandwidth part of the respective PDSCH and is used by the UE for a data demodulation, as is also described in reference [1]. The components of the SSB are transmitted together, i.e., these components have the same time periodicity. The transmission of the components of the SSB may be beam-formed in a time/frequency-division multiplexing beam-sweeping manner and used, for example, for an initial cell selection and for radio resource management, RRM, measurements by the UE.

FIG. 2 illustrates an example of the beam-sweeping transmission at a base station or gNB. FIG. 2 illustrates a $gNB_1$ at a first time $t_1$ and at a second time $t_2$, and the time/frequency-domain which is used for transmitting symbols by the $gNB_1$. As is illustrated schematically, at the time $t_1$ the transmission of N synchronization signal blocks SSB 1 to SSB N is started, and the respective individual blocks are transmitted in a time sequential manner. Since synchronization needs to be carried out on a more or less regular basis, after a certain SSB period, for example at the time $t_2$, the respective synchronization signal blocks SSB 1 to SSB N are again transmitted, again in a time sequential manner. The $gNB_1$ comprises an antenna array $ANT_1$ including a plurality of antenna elements. Alternatively, the $gNB_1$ may include a plurality of separate antenna arrays or antennal elements. The plurality of antennas allows the $gNB_1$ to beam-form beams which are directed into different spatial directions. FIG. 2 illustrates the plurality of different beams as beams $150_1$, $150_2$ to $150_N$. The respective beams 150 are used for transmitting the respective signal synchronization blocks SSB 1 to SSB N in different spatial directions at the time $t_1$ and at the time $t_2$ so as to allow receipt of the respective SSBs at UEs positioned at the respective locations towards which the one or more of the beams 150 may be directed to.

Various CSI-RS transmission and reporting mechanisms are employed in the 3GPP, see for example reference [2]. For non-precoded CSI-RSs a one-to-one mapping between a CSI-RS port and a transmit-receive-unit, TXRU, of an antenna array at the gNB is used. Therefore, the non-precoded CSI-RS provides a cell-wide coverage where the different CSI-RS ports have the same beam direction and beam width. On the other hand, when using precoded CSI-RSs, the CSI-RS ports are beam-formed to form several narrow beams in different directions, and each beam provides for a spatially selective coverage instead of a cell-wide coverage.

Wireless communication systems operating at millimeter wave, mm-wave, frequency ranges, like 28 GHz, 40 GHz or 60 GHz, are characterized by an increased signal attenuation or path loss when compared to wireless systems operating at lower frequency ranges, like below 6 GHz. Beam-forming, both at the user equipment and the base station, gNB, may be used for directional communication so as to compensate for the high path loss. For example, in 5G NR beam-formed DL reference signals, such as the SSB, and beam-formed uplink, UL, reference signals, such as a beam-formed sounding reference signal, SRS, may be transmitted by the gNB/UE in a beam-sweeping operation into different spatial directions. The UE may perform DL measurements on the received beam-formed RSs transmitted by the gNB so as to identify and select one or more beams for a beam-formed DL transmission. In a similar manner, the gNB may perform UL measurements on the received beam-formed RSs, which are transmitted by the UE, to identify and select one or more beams for a beam-formed UL transmission. The UE may use a beam-formed DL RS for beam reporting to the gNB, for example in the form of the reference signal received power, RSRP, values, as described in sub-clause 5.1.6.1 of reference [2]. To improve the RRM measurement performance of the UE for beam-reporting, a UE-specific narrow beam-formed CSI-RS may be configured by the gNB and may be used by the UE to improve the measurement accuracy on the received beam-formed DL RSs, for example in terms of the signal-to-interference-and-noise ratio, SINR, or the RSRP/RSRQ accuracy, when compared to wide beam SSB measurements. FIG. 3 illustrates the use of beam-formed CSI- RSs for UE beam measurements. The gNB$_1$ has the antenna ANT$_1$ comprising respective elements so as to allow for the beam-forming mentioned above. As is illustrated in FIG. 3, besides the SSB beams, which are schematically illustrated by the dotted lines, also a plurality of CSI-RS beams $150_{n-1}$ to $150_m$ are beam-formed, which are schematically illustrated by the solid lines.

The uplink, UL, and the downlink, DL, in a the wireless communication systems described above, like a mm-wave wireless communication system, may operate in a time division duplexing, TDD, mode, where beam correspondence between transmit and receive beams may exist at the UE/gNB such that the UE/gNB may be able to perform a beam association between transmit and received beams. FIG. 4 illustrates an example for a beam correspondence at the UE which is in communication with a gNB. The gNB$_1$ has the antenna ANT$_1$ capable of forming a plurality of DL transmission beams 150 which may be generated in a time sequential manner so that a beam sweeping procedure is implemented. The user equipment UE$_1$ has an antenna ANT$_{UE}$ which is formed of a plurality of antenna elements and/or a plurality of antenna arrays having respective antenna elements so as to allow for generating a plurality of UE beams 152 directed into different spatial directions. The UE beams may be generated in a time sequential manner so as to also allow for a beam sweeping procedure.

For signal reception (downlink) from the gNB$_1$, the UE$_1$ uses its antenna ANT$_{UE}$ to form a plurality of UE receive, Rx, beams, and for transmitting (uplink) towards the gNB$_1$, the UE$_1$ uses its antenna ANT$_{UE}$ to form a plurality of UE transmit, Tx, beams. The gNB$_1$ performs transmit beam sweeping, and the UE$_1$ performs measurements on the beam-formed DL RSs received from the gNB$_1$ via the respective beams 150. In the example of FIG. 4, it is assumed that the UE$_1$ identifies the Rx beam 154 as a beam receiving the beam-formed DL RS from the gNB$_1$. Beam correspondence exists at the UE in case the UE$_1$ determines that for the Rx beam 150 a corresponding Tx beam exists. This means that, for example, a Tx beam may be formed by respective antennas or antenna elements of the UE$_1$ antenna structure such that the beam characteristics are substantially similar, e.g., the beam direction is basically the same, the beam width is at least the same and the like. In case beam correspondence is determined at the UE, further beam-sweeping operations for a UL beam identification at the gNB or a DL beam identification at the UE are not necessary as the parameters needed to from a desired beam are already known from the Rx beam.

In the example of FIG. 4, if beam correspondence exists at the UE$_1$,
 the UE identifies for a DL reception beam a corresponding UL transmission beam for the corresponding uplink transmission, e.g., based solely on DL channel measurements on transmitted beam-formed RSs, such as the SSB and/or the CSI-RS, from the gNB, and/or
 the UE identifies for an indicated UL transmission beam for the UL transmission to the gNB a corresponding DL reception beam for the corresponding downlink reception.

Also the gNB may provide for beam correspondence, and if beam correspondence exists at the gNB$_1$,
 the gNB identifies for a UL reception beam a corresponding DL transmission beam for its downlink transmission, e.g., based solely on UL channel measurements on the transmitted beam-formed RSs, such as SRS, from the UE, and/or
 the gNB identifies for an indicated UL transmission beam from the UE a corresponding gNB DL reception beam for its DL reception (see reference [3]).

The existence of beam correspondence at the UE or at the gNB is dependent on various factors, for example, when the transceivers' hardware is taken into account, beam correspondence may not exist due to different hardware components used in the radio frequency, RF, chains for the signal transmission and reception. In such cases, mechanisms for the calibration may be considered to compensate for such hardware impairments, as is described in references [7] to [12], so as to provide beam correspondence. Moreover, the existence of beam correspondence at the UE or at the gNB may be dependent on the antenna structures at the UE/gNB and whether, using the antennas, corresponding Rx/Tx beams may be generated. For example, a UE or a gNB may be equipped with a plurality of antenna arrays for signal transmission and signal reception. An antenna array may also be referred to as an antenna panel or simply as a panel. For example, FIG. 5 is a schematic representation of an example of a UE/gNB including different antenna arrays placed at different locations. The UE/gNB may be equipped with one or more combined Tx/Rx antenna arrays 156 used both for signal reception and transmission, and a plurality of Rx antenna arrays $158_1$ to $158_3$ used solely for signal reception. In accordance with other examples, also Tx antenna arrays used solely for signal transmission may be provided. A combined Tx/Rx antenna array 156 may use the same or separate physical antennas for the transmission and reception. Dependent on the antenna array placement/configurations, the antenna array implementations and the level of antenna array calibration the UE/gNB may support beam correspondence or not. However, no mechanism is available for signaling among the entities of the wireless communication system, like the gNB and the UE, whether beam correspondence exists and, if it exists, to what extent, i.e., only for some or for all of the beams that may be formed at the UE or at the gNB.

It is noted that the information in the above section is only for enhancing the understanding of the background of the invention and therefore it may contain information that does not form conventional technology that is already known to a person of ordinary skill in the art.

SUMMARY

An embodiment may have a user equipment, UE, for communicating with a base station, BS, in a wireless communication system, wherein the UE has one or more antenna arrays, each antenna array having a plurality of antenna elements, wherein the UE is configured to receive one or more downlink, DL, transmission beams from the BS; select an uplink, UL, transmission beam for the UL communication with the BS, determine whether one or more certain regulatory requirements or constraints prohibit the use of the selected UL transmission beam, in case there are no regulatory requirements or constraints prohibiting the use of the selected UL transmission beam, use the selected UL transmission beam for the UL communication with the BS, and in case there are regulatory requirements or constraints prohibiting the use of the selected UL transmission beam, select for the UL communication with the BS another UL transmission beam for which no regulatory requirements or constraints exist.

Another embodiment may have a wireless communication network, having: at least one user equipment, UE, wherein the UE has one or more antenna arrays, each antenna array having a plurality of antenna elements, and wherein the UE is configured to receive one or more downlink, DL, transmission beams from the BS; select an uplink, UL, transmission beam for the UL communication with the BS, determine whether one or more certain regulatory requirements or constraints prohibit the use of the selected UL transmission beam, in case there are no regulatory requirements or constraints prohibiting the use of the selected UL transmission beam, use the selected UL transmission beam for the UL communication with the BS, and in case there are regulatory requirements or constraints prohibiting the use of the selected UL transmission beam, select for the UL communication with the BS another UL transmission beam for which no regulatory requirements or constraints exist, and at least one base station, BS for communicating with the at least one UE.

Another embodiment may have a method in a wireless communication system having a user equipment, UE, and a base station, BS, wherein the UE has one or more antenna arrays, each antenna array having a plurality of antenna elements, the method having the steps of: receiving, at the UE, one or more DL transmission beams from the BS; selecting an UL transmission beam for the UL communication with the BS, determining whether one or more certain regulatory requirements or constraints prohibit the use of the selected UL transmission beam, in case there are no regulatory requirements or constraints prohibiting the use of the selected UL transmission beam, using the selected UL transmission beam for the UL communication with the BS, and in case there are regulatory requirements or constraints prohibiting the use of the selected UL transmission beam, selecting for the UL communication with the BS another UL transmission beam for which no regulatory requirements or constraints exist.

Another embodiment may have a computer readable medium having stored thereon a computer program having instructions which, when executed on a computer, cause the computer to carry out a method in a wireless communication system having a user equipment, UE, and a base station, BS, wherein the UE has one or more antenna arrays, each antenna array having a plurality of antenna elements, the method having the steps of: receiving, at the UE, one or more DL transmission beams from the BS; selecting an UL transmission beam for the UL communication with the BS, determining whether one or more certain regulatory requirements or constraints prohibit the use of the selected UL transmission beam, in case there are no regulatory requirements or constraints prohibiting the use of the selected UL transmission beam, using the selected UL transmission beam for the UL communication with the BS, and in case there are regulatory requirements or constraints prohibiting the use of the selected UL transmission beam, selecting for the UL communication with the BS another UL transmission beam for which no regulatory requirements or constraints exist.

BRIEF DESCRIPTION OF THE DRAWINGS

Embodiments of the present invention will be detailed subsequently referring to the appended drawings, in which:

FIG. 16 illustrates an example of a computer system on which units or modules as well as the steps of the methods described in accordance with the inventive approach may execute.

DETAILED DESCRIPTION OF THE INVENTION

In the following, embodiments of the present invention are described in further detail with reference to the enclosed drawings in which elements having the same or similar function are referenced by the same reference signs.

Figure 1:
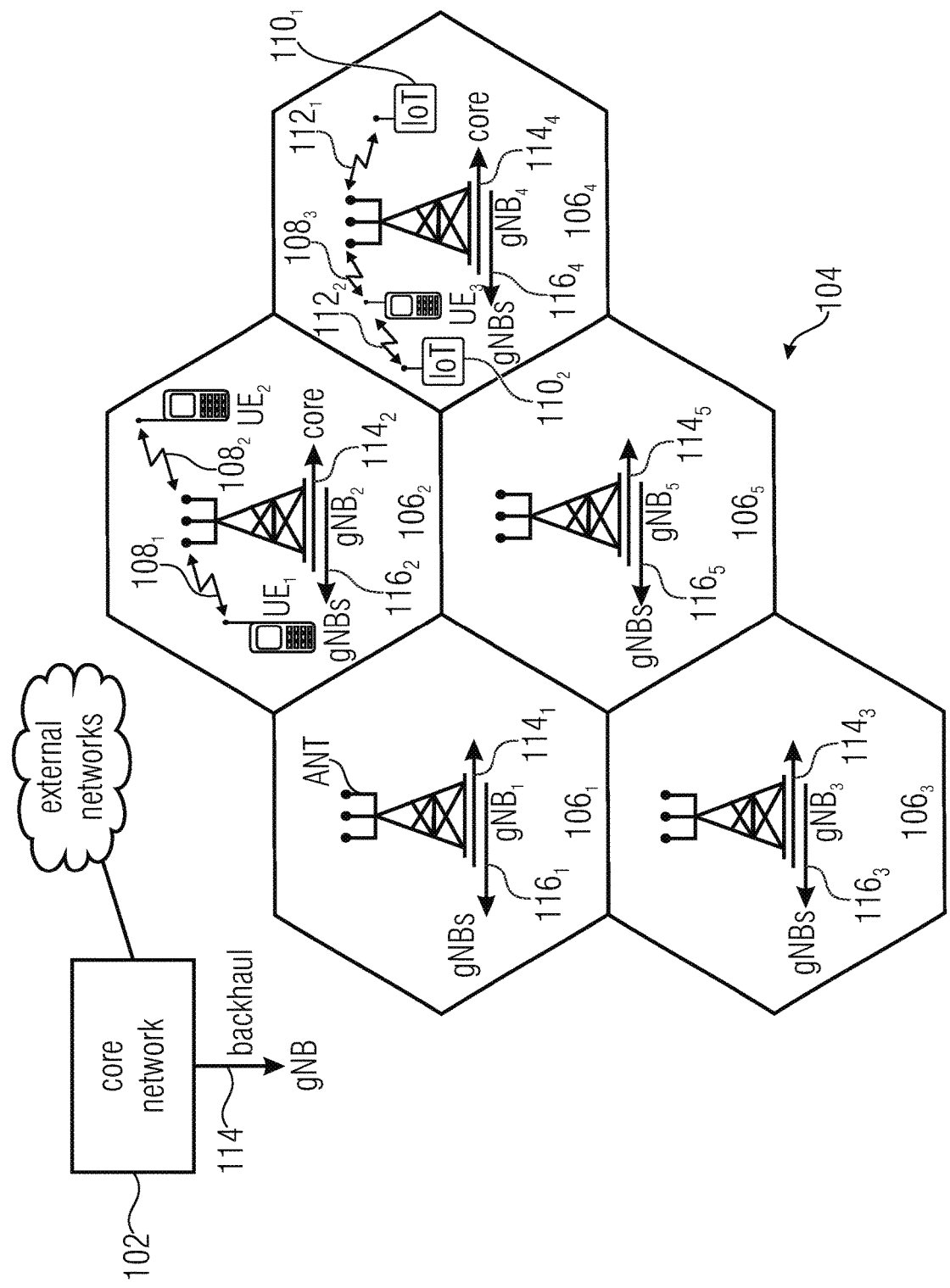
FIG. 1 shows a schematic representation of an example of a wireless communication system.
Figure 2:
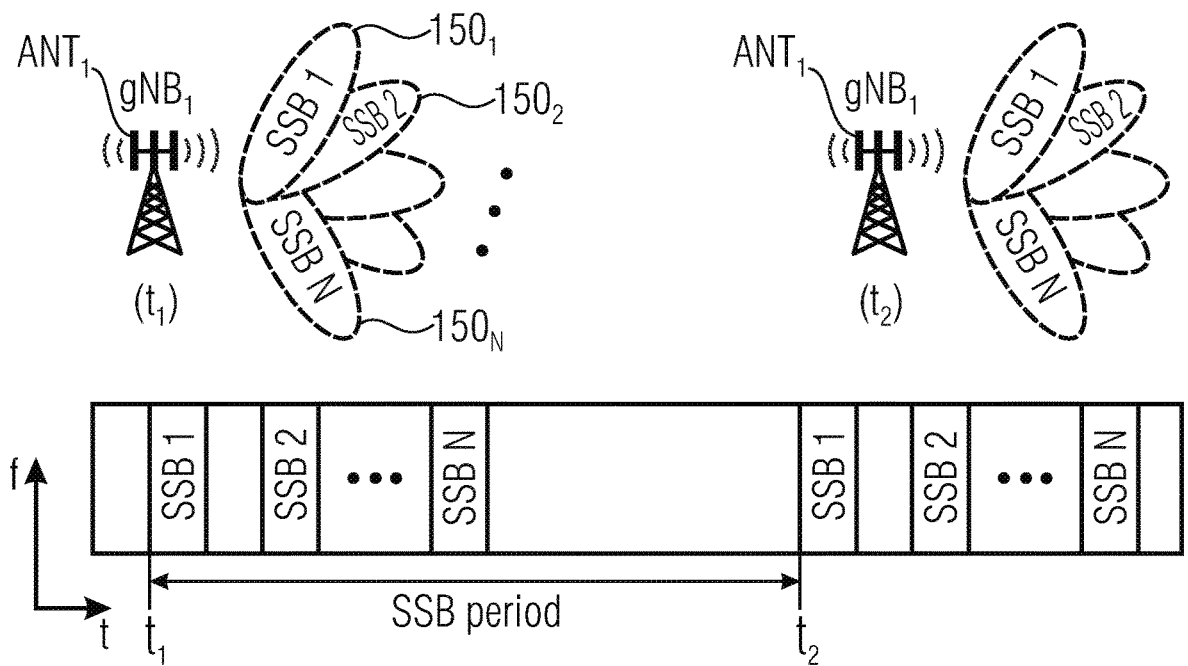
FIG. 2 illustrates an example of the beam-sweeping transmission at a base station or gNB.
Figure 3:
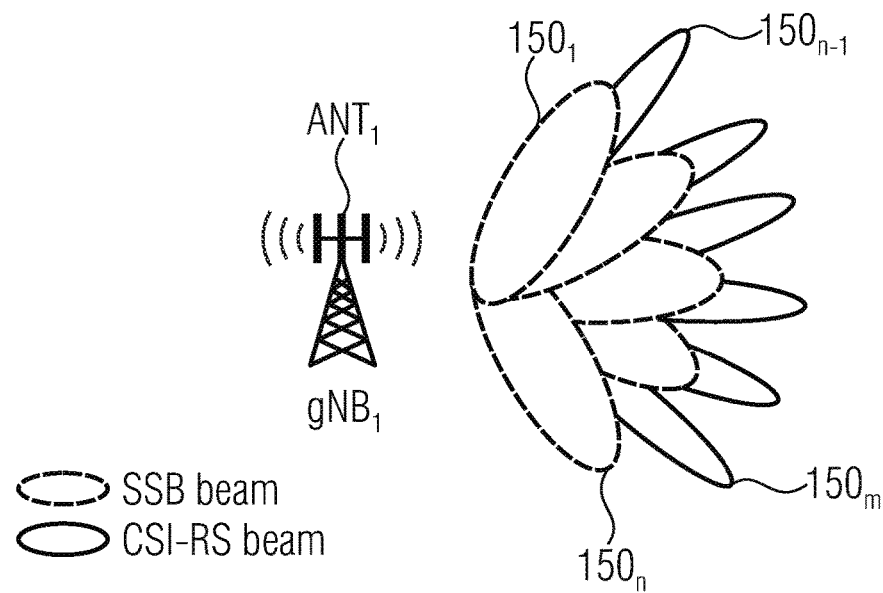
FIG. 3 illustrates the use of beam-formed CSI-RSs for UE beam measurements.
Figure 4:
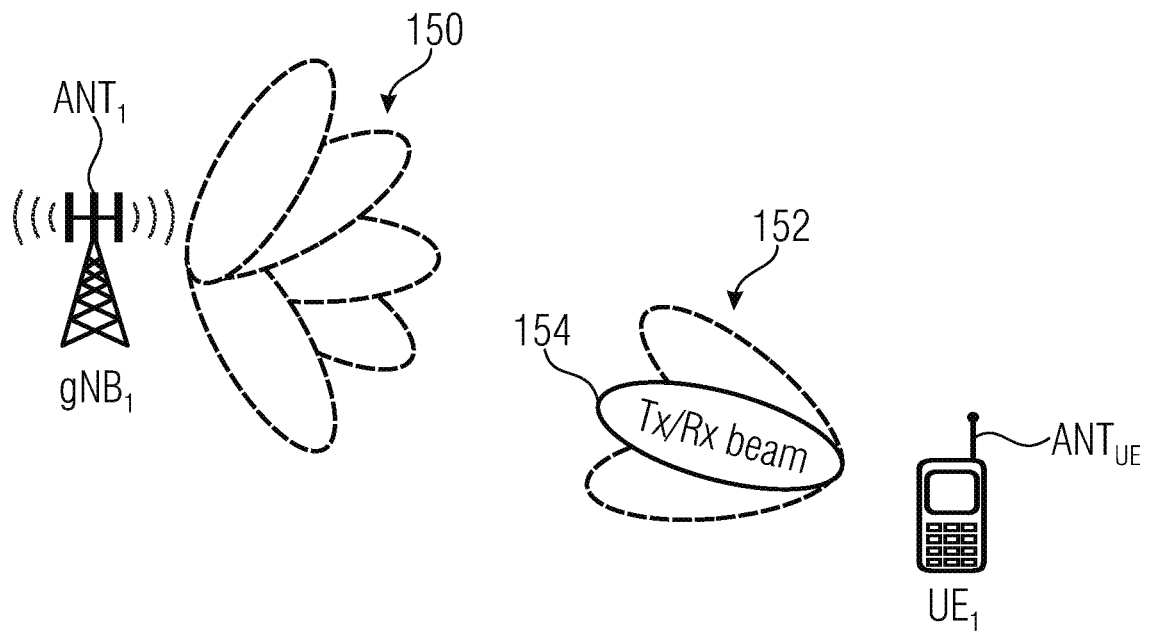
FIG. 4 illustrates an example for a beam correspondence at the UE which is in communication with a gNB.
Figure 6:
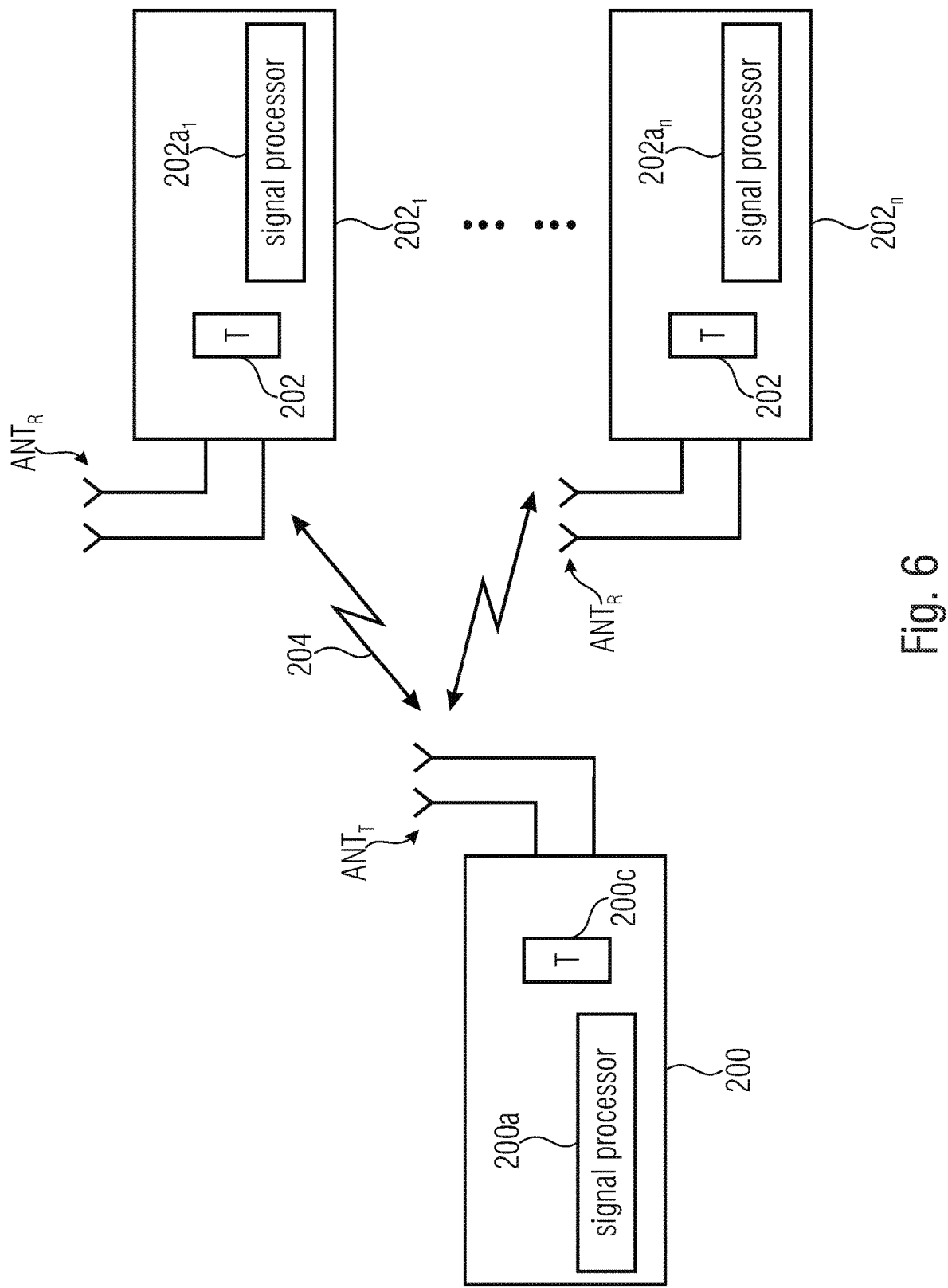
FIG. 6 is a schematic representation of a wireless communication system for communicating information between a transmitter, which may operate in accordance with the inventive teachings described herein, and a receiver, which may operate in accordance with the inventive teachings described herein.

Embodiments of the present invention may be implemented in a wireless communication system or network as depicted in FIG. 1 or FIG. 2 including transmitters or transceivers, like base stations, and communication devices (transceivers) or users, like mobile or stationary terminals or IoT devices, as mentioned above. FIG. 6 is a schematic representation of a wireless communication system for communicating information between a transmitter 200, like a base station, and a plurality of communication devices $202_1$ to $202_n$, like UEs, which are served by the base station 200. The base station 200 and the UEs 202 may communicate via a wireless communication link or channel 204, like a radio link. The base station 200 includes one or more antennas $ANT_T$ or an antenna array having a plurality of antenna elements, a signal processor 200a and a transceiver 200b, coupled with each other. The base station 200, e.g., using the signal processor 200a and the transceiver 200b, performs beamforming so as to provide respective beams towards the UEs 202₁, 202₂, e.g., beams 150 as described above with reference to FIG. 2, FIG. 3 or FIG. 4. The UEs 202 include one or more antennas $ANT_R$ or an antenna array having a plurality of antennas, a signal processor 202a₁, 202aₙ, and a transceiver 202b₁, 202bₙ coupled with each other. The UE 202₁, e.g., using the signal processor 202a and the transceiver 202b, performs beamforming so as to provide respective beams towards the base station 200, e.g., beams 152, 154 as described above with reference to FIG. 4. The base station 200 and the respective UEs 202 may operate in accordance with the inventive teachings described herein.

User Equipment (a) Beam Correspondence Capability Indicated as UE Feature

The present invention provides a user equipment, UE, for communicating with a base station, BS, in a wireless communication system, wherein the UE comprises one or more antenna arrays, each antenna array having a plurality of antenna elements, and wherein the UE is configured to signal to a BS, dependent on a property of the one or more antenna arrays, whether the UE supports full beam correspondence, partial beam correspondence or no beam correspondence.

In accordance with embodiments, responsive to a plurality of BS downlink, DL, transmission beams transmitted by the BS, the UE is configured to determine one or more DL reception beams, each DL reception beam is associated with a DL transmission beam from the BS, the DL reception beam being represented by an UE receive, Rx, beam or by a combination of a plurality of UE Rx beams, wherein each UE Rx beam is formed by one or more of the antenna arrays, and in case of full beam correspondence with an uplink, UL, transmission, the UE identifies for each determined DL reception beam an associated UL transmission beam, the UL transmission beam being represented by an UE transmit, Tx, beam or by a combination of a plurality of UE Tx beams, wherein each UE Tx beam is formed by one or more of the antenna arrays, in case of no beam correspondence with the UL transmission, the UE does not identify for any of the DL reception beams an associated UL transmission beam, and in case of partial beam correspondence with the UL transmission, the UE identifies for a DL reception beam an UL transmission beam being represented by a plurality of UE Tx beams, wherein for a first set of the UE Rx beams the UE does not identify an associated UL transmission beam being represented by an UE transmit, Tx, beam or by a combination of a plurality of UE Tx beams so that a beam correspondence does not exist, and for a second set of the UE Rx beams the UE identifies an associated UL transmission beam being represented by an UE transmit, Tx, beam or by a combination of a plurality of UE Tx beams so that a beam correspondence exists.

In accordance with embodiments, responsive to a plurality of BS downlink, DL, transmission beams transmitted by the BS, the UE is configured to determine one or more DL reception beams, each DL reception beam is associated with a DL transmission beam from the BS, the DL reception beam being represented by an UE receive, Rx, beam or by a combination of a plurality of UE Rx beams, wherein each UE Rx beam is formed by one or more of the antenna arrays, and in case of full beam correspondence with an uplink, UL, transmission, the UE identifies for each determined DL reception beam an associated UL transmission beam, the UL transmission beam being represented by an UE transmit, Tx, beam or by a combination of a plurality of UE Tx beams, wherein each UE Tx beam is formed by one or more of the antenna arrays, in case of no beam correspondence with the UL transmission, the UE does not identify for any of the DL reception beams an associated UL transmission beam, and in case of partial beam correspondence with the UL transmission, the UE identifies for a first DL reception beam an associated UL transmission beam so that beam correspondence exists, and the UE does not identify for a second DL reception beam an associated UL transmission beam so that beam correspondence does not exist.

In accordance with embodiments, the UE is configured to transmit a plurality of UL transmission beams, the UE is configured to identify the one or more DL reception beams responsive to a signaling from the BS indicating the UL transmission beams which are received at the BS, and in case of full beam correspondence with a DL transmission, the UE identifies for an indicated UL transmission beam an associated DL reception beam, and in case of no beam correspondence with the DL transmission, the UE does not identify for an indicated UL transmission beam an associated DL reception beam.

In accordance with embodiments, the UE is configured to signal full beam correspondence if the UE supports beam correspondence with the UL transmission and/or the UE supports beam correspondence with the DL transmission, no beam correspondence if the UE supports no beam correspondence with the UL transmission and the UE supports no beam correspondence with the DL transmission, and partial beam correspondence if the UE supports partial beam correspondence with the UL transmission.

In accordance with embodiments, an UL transmission beam and a DL reception beam are associated with each other so as to provide a beam correspondence in case the UL transmission beam and the DL transmission beam share at least a subset of predefined beam properties, the subset of predefined beam properties comprising one or more of beam direction, like an angle of arrival or an angle of departure, beam width, like a UE Tx beam width being equal to or smaller than an UE Rx beam width, a correlation value, like a full correlation or a correlation above a defined value/threshold, and beam shape.

In accordance with embodiments, the one or more antenna arrays comprise one or more of a first set of one or more antenna arrays supporting beam correspondence and including one or more transceive, RX/TX, arrays used for both signal reception and signal transmission, a second set of one or more antenna arrays not supporting beam correspondence and including one or more RX/TX arrays used for both signal reception and signal transmission, a third set of one or more antenna arrays not supporting beam correspondence and including one or more receive, RX, arrays used solely for signal reception, and a fourth set of one or more antenna arrays not supporting beam correspondence and including one or more transmit, TX, arrays used solely for signal transmission.

In accordance with embodiments, an antenna array of the first set comprises a plurality of antenna elements which are shared for reception and transmission, or an antenna array of the first set comprises a plurality of antenna elements, wherein separate antenna elements are used for reception and transmission.

In accordance with embodiments, the UE comprises one or more antenna arrays solely of the first set, wherein the UE is configured to signal to the BS that the UE supports full beam correspondence for all of its antenna arrays.

In accordance with embodiments, the UE comprises one or more antenna arrays solely of the second, third or fourth sets, wherein the UE is configured to signal to the BS that the UE does not support beam correspondence.

In accordance with embodiments, the UE comprises one or more antenna arrays of the first set and one or more antenna arrays of any one of the second, third or fourth sets, wherein the UE is configured to signal to the BS that the UE partially supports beam correspondence.

(b) Beam Correspondence Indication for Beam Reporting/Beam Correspondence Signaling for Uplink Beam Sweeping The present invention provides a user equipment, UE, for communicating with a base station, BS, in a wireless communication system, wherein the UE comprises one or more antenna arrays, each antenna array having a plurality of antenna elements, wherein, responsive to a plurality of BS downlink, DL, transmission beams transmitted by the BS, the UE is configured to determine one or more DL reception beams, wherein each DL reception beam is associated with a DL transmission beam from the BS, the DL reception beam being represented by a UE Rx beam or a combination of a plurality of UE Rx beams, wherein each UE Rx beam is formed by one or more of the antenna arrays, wherein the UE supports either full beam correspondence, no beam correspondence, or partial beam correspondence, and wherein the UE is configured to signal to the BS a beam report about the one or more DL reception beams so as to allow the BS to identify one or more associated BS transmission, Tx, beams for a DL transmission to the UE.

In accordance with embodiments, the UE is configured to receive from the BS a control signal causing the UE to report only those DL reception beams for which a beam correspondence with an uplink, UL, transmission exists.

In accordance with embodiments, the UE is configured, responsive to the control signal from the BS, to determine a DL reception beam using a UE Rx beam or a combination of a plurality of UE Rx beams, wherein for each of the UE Rx beams a beam correspondence with the UL transmission exists.

In accordance with embodiments, the UE is configured to signal in addition to the beam report a beam correspondence bitmap, the beam correspondence bitmap comprising a set of binary flags, each flag indicating if for a reported DL reception beam a corresponding UL transmission beam exists or not.

The present invention provides a user equipment, UE, for communicating with a base station, BS, in a wireless communication system, wherein the UE comprises one or more antenna arrays, each antenna array having a plurality of antenna elements, wherein, responsive to a plurality of BS downlink, DL, transmission beams transmitted by the BS, the UE is configured to determine one or more DL reception beams, wherein each DL reception beam is associated with a DL transmission beam from the BS, the DL reception beam being represented by a UE Rx beam or a combination of a plurality of UE Rx beams, wherein each UE Rx beam is formed by one or more of the antenna arrays, wherein for a DL reception beam either a beam correspondence, no beam correspondence, or a partial beam correspondence with an uplink, UL, transmission exists, and wherein the UE is configured to signal to the BS a beam report about the one or more DL reception beams so as to allow the BS to identify one or more associated BS transmission, Tx, beams for a DL transmission to the UE.

In accordance with embodiments, the UE is configured to receive from the BS a control signal causing the UE to report only those DL reception beams for which a beam correspondence or a partial beam correspondence with an uplink, UL, transmission exists.

In accordance with embodiments, the UE is configured, responsive to the control signal from the BS, to determine a DL reception beam using a UE Rx beam or a combination of a plurality of UE Rx beams, and, in case of partial beam correspondence, for a first combination of the UE Rx beams a beam correspondence with the UL transmission exists, and for a second combination of the UE Rx beams a beam correspondence with the UL transmission does not exist.

In accordance with embodiments, the UE is configured to signal in addition to the beam report a beam correspondence bitmap, the beam correspondence bitmap comprising a set of binary flags, each flag indicating if for a reported DL transmission beam an UL transmission beam with full/partial correspondence exists or not.

In accordance with embodiments, the UE is configured to
  determine a first quality or strength for a reported DL reception beam using a set of UE Rx beams determined for the reported DL reception beam, wherein for each UE Rx beam in the set a corresponding UE Tx beam with the UL transmission may exist or not exist,
  determine a second quality or strength for the reported DL reception beam using the UE Rx beams out of the set of UE Rx beams for which corresponding UE Tx beams with the UL transmission exist, and
  indicate via the flag that a beam correspondence or a partial beam correspondence with the reported DL reception beam exists if the first quality or strength reduced by the second quality or strength is below a first threshold value, or if the ratio of the first quality or strength and the second quality or strength is below a second threshold value.

In accordance with embodiments, the UE is configured to receive the first and/or second threshold values from the BS, and/or wherein the UE is configured to report the difference or the ratio of the first quality or strength and the second quality or strength.

In accordance with embodiments, the UE is configured to calculate a quality or strength of a DL reception beam by analyzing one or more associated DL reference signals, RS, transmitted by the BS and received by respective RF receiver branches associated with one or more antenna arrays.

In accordance with embodiments, the UE is configured to report the one or more DL reception beams responsive to a configuration message received from the BS, wherein the beam correspondence bitmap is reported to the BS responsive to a corresponding explicit indication in the configuration message, or wherein the beam correspondence bitmap is reported to the BS by default in case the configuration message does not include the explicit indication.

In accordance with embodiments,
the UE is configured to select an UL transmission beam for a transmission to the BS, responsive to the BS signaling a DL transmission beam identified by the BS for the DL transmission to the UE, and
an UL transmission beam is represented by a UE transmit, TX, beam, or a combination of a plurality of UE Tx beams, and wherein each UE Tx beam is formed by one or more of the antenna arrays of the UE.

In accordance with embodiments, the UE is configured to receive a BS signaling of a DL transmission beam identified by the BS for the DL transmission to the UE, wherein
in case of beam correspondence of the received DL beam associated with the signaled DL transmission beam, the UE is configured to identify an UL transmission beam for a transmission to the BS, the UL transmission beam being represented by a UE transmit, TX, beam or a combination of a plurality of UE Tx beams, wherein each UE Tx beam is formed by one or more of the antenna arrays of the UE, and to report to the BS that the UE provides beam correspondence with the selected DL transmission beam, or
in case of no beam correspondence of the received DL beam associated with the signaled DL transmission beam, the UE is configured to report to the BS that the UE provides no beam correspondence with the selected DL transmission beam, and the UE is configured to receive a signal from the BS causing the UE to initiate a beam sweep procedure for generating a plurality of UL transmission beams so as to allow the BS to determine one or more UL reception beams and to report one or more UL transmission beams to the UE which are suitable for the UL transmission.

The present invention provides a user equipment, UE, for communicating with a base station, BS, in a wireless communication system, wherein the UE comprises one or more antenna arrays, each antenna array having a plurality of antenna elements, wherein, the UE is configured to receive a signal from the BS causing the UE to initiate a beam sweep procedure for generating a plurality of UL transmission beams so as to allow the BS to determine one or more UL reception beams and to report one or more UL transmission beams to the UE which are suitable for the UL transmission, and wherein the UE is configured to report for one or more UL transmission beams indicated by the BS a beam correspondence bitmap, the beam correspondence bitmap comprising a set of binary flags, each flag indicating if for a UL transmission beam a beam correspondence with a DL reception exists or not.

In accordance with embodiments, the UE is configured to select a DL reception beam for a DL reception of the BS signals, responsive to the BS signaling of the UL transmission beam identified by the BS for the UL transmission from the UE to the BS.

(c) Beam Correspondence Signaling for Uplink Beam Sweeping

The present invention provides a user equipment, UE, for communicating with a base station, BS, in a wireless communication system, wherein the UE comprises one or more antenna arrays, each antenna array having a plurality of antenna elements, wherein the UE supports partial beam correspondence and is configured to
receive a signal from the BS causing the UE to initiate a beam sweep procedure for generating a plurality of UL transmission beams so as to allow the BS to determine one or more UL transmission beams which are suitable for the UL transmission,
wherein each UL transmission beam is represented by one UE transmit, Tx, beam, or a combination of a plurality of UE Tx beams, each UE Tx beam associated with or formed by one or more antenna arrays, and
wherein only those UL transmission beams are used in the beam sweep procedure for which an associated DL reception beam exist, a DL reception beam represented by one UE receive, Rx, beam, or a combination of a plurality of UE Rx beams, and each UE Rx beam associated with or formed by one or more antenna arrays, and
determine, using the antenna arrays, one or more associated DL reception beams for a downlink reception corresponding to the indicated UL transmission beams.

In accordance with embodiments, responsive to the signal from the BS causing the UE to initiate the beam sweep procedure, the UE is configured to perform the beam sweeping operation of UL transmission beams in different directions.

In accordance with embodiments, the UE is configured to transmit a plurality of UL transmission beams in different directions, the plurality of UL transmission beams including at least a first UL transmission beam directed in a first direction and a second UL transmission beam directed in a second direction, the first direction and the second direction being different from each other.

In accordance with embodiments, each UL transmission beam has associated therewith a certain UL RS, like a sounding reference signal, a demodulation reference signal, a random access sequence, or any other pilot signal.

(d) Beam Correspondence Indication in UL Beam Report to gNB

The present invention provides a user equipment, UE, for communicating with a base station, BS, in a wireless communication system, wherein the UE comprises one or more antenna arrays, each antenna array having a plurality of antenna elements, and wherein the UE is configured to
receive a signal from the BS causing the UE to initiate a beam sweep procedure for generating a plurality of UL transmission beams so as to allow the BS to determine one or more UL transmissions beams, and to report one or more UL transmission beams to the UE which are suitable for the UL transmission,
wherein each UL transmission beam is represented by one UE transmit, Tx, beam, or a combination of a plurality of UE Tx beams, each UE Tx beam associated with or formed by one or more antenna arrays, and
wherein each UL transmission beam has an associated DL reception beam, a DL reception beam represented by one UE receive, Rx, beam, or a combination of a plurality of UE Rx beams, each UE Rx beam associated with of formed by one or more antenna arrays, and
provide an indication which of the UL transmission beams generated by the beam sweep procedure has an associated DL reception beam at the UE so as to allow the BS to decide if beam correspondence at the BS is established or a DL beam sweeping procedure needs to be initiated at the BS.

In accordance with embodiments, the UE is configured to receive a beam report from the BS indicating to the UE the UE UL transmission beams suitable for an UL transmission, and wherein the UE is configured to provide a beam correspondence indication for the reported UL beams.

In accordance with embodiments,
the UE is configured to determine and report to the BS a beam correspondence bitmap for the one or more UE UL transmission beams, the beam correspondence bitmap comprising a set of binary flags, each flag indicating if for the one or more transmit beams a beam correspondence exists or not, and
a beam correspondence exists, if the UE is able to determine at least one UE DL reception beam for the DL reception, and
no beam correspondence exists, if the UE is not able to determine a UE DL reception beam for the DL reception.

In accordance with embodiments, the indication from the BS comprises a beam correspondence bitmap, the beam correspondence bitmap comprising a set of binary flags, each flag indicating if for an indicated UE UL beam a beam correspondence in the DL exists or not.

(e) Selective Use of a Selected Uplink Transmission Beam

The present invention provides a user equipment, UE, for communicating with a base station, BS, in a wireless communication system, wherein the UE comprises one or more antenna arrays, each antenna array having a plurality of antenna elements, wherein the UE is configured to
receive one or more downlink, DL, transmission beams from the BS;
select an uplink, UL, transmission beam for the UL communication with the BS,
determine whether one or more certain regulatory requirements or constraints prohibit the use of the selected UL transmission beam,
in case there are no regulatory requirements or constraints prohibiting the use of the selected UL transmission beam, use the selected UL transmission beam for the UL communication with the BS, and
in case there are regulatory requirements or constraints prohibiting the use of the selected UL transmission beam, select for the UL communication with the BS another UL transmission beam for which no regulatory requirements or constraints exist.

In accordance with embodiments, the UE is configured to receive from the BS a control signal causing the UE to send to the BS a beam report indicating only DL reception beams for which an UL transmission beam exists, a DL reception beam being associated with a DL transmission beam from the BS.

In accordance with embodiments, the UE is configured to receive from the BS a control signal causing the UE to
send to the BS a beam report indicating the DL reception beams, a DL reception beam being associated with a DL transmission beam from the BS, and
signal in addition to the beam report a beam correspondence bitmap, the beam correspondence bitmap comprising a set of binary flags, each flag indicating if for a reported DL reception beam an UL transmission beam exists or not.

In accordance with embodiments, the UE is configured to
determine a first quality or strength for a reported DL reception beam using a set of UE Rx beams determined for the reported DL reception beam, wherein for each UE Rx beam in the set a UE Tx beam for forming the UL transmission beam may exist or not exist,
determine a second quality or strength for the reported DL reception beam using the UE Rx beams out of the set of UE Rx beams for which UE Tx beams for forming the UL transmission beam exist, and
indicate via a flag that an UL transmission beam exists if the first quality or strength reduced by the second quality or strength is below a first threshold value, or if the ratio of the first quality or strength and the second quality or strength is below a second threshold value.

Base Station

(a) Beam Correspondence Capability Indicated as UE Feature

The present invention provides a base station, BS, for communicating with a user equipment, UE, in a wireless communication system, wherein the BS comprises one or more antenna arrays, each antenna array having a plurality of antenna elements, and wherein the BS is configured to receive from the UE a signal indicating whether the UE supports beam correspondence, partial beam correspondence or no beam correspondence to a BS, dependent on a property of one or more antenna arrays at the UE.

(b) Beam Correspondence Indication for Beam Reporting/Beam Correspondence Signaling for Uplink Beam Sweeping The present invention provides a base station, BS, for communicating with a user equipment, UE, in a wireless communication system, wherein the BS comprises one or more antenna arrays, each antenna array having a plurality of antenna elements, wherein the BS is configured to
transmit a plurality of BS downlink, DL, transmission beams,
receive from a UE a beam report about one or more DL reception beams at the UE, the one or more DL reception beams being associated with the DL transmission beams received at the UE, and the UE supporting either full beam correspondence, no beam correspondence, or partial beam correspondence; and
responsive to the beam report, identify one or more associated BS transmission, Tx, beams for a DL transmission to the UE.

The present invention provides a base station, BS, for communicating with a user equipment, UE, in a wireless communication system, wherein the BS comprises one or more antenna arrays, each antenna array having a plurality of antenna elements, wherein the BS is configured to
transmit a plurality of BS downlink, DL, transmission beams, and
receive from a UE a beam report about one or more DL reception beams at the UE, the one or more DL reception beams being associated with the DL transmission beams received at the UE, wherein for a DL reception beam either a beam correspondence, no beam correspondence, or a partial beam correspondence with an uplink, UL, transmission exists; and responsive to the beam report, identify one or more associated BS transmission, Tx, beams for a DL transmission to the UE.

The present invention provides a base station, BS, for communicating with a user equipment, UE, in a wireless communication system, wherein the BS comprises one or more antenna arrays, each antenna array having a plurality of antenna elements, wherein the BS is configured to
- signal to the UE to initiate a beam sweep procedure for generating a plurality of UL transmission beams,
- determine one or more UL reception beams;
- report one or more UL transmission beams to the UE which are suitable for the UL transmission, and
- receive from the UE a beam correspondence bitmap, the beam correspondence bitmap comprising a set of binary flags, each flag indicating if for a reported UL transmission beam a beam correspondence with a DL reception at the UE exists or not.

(c) Beam Correspondence Indication in UL Beam Report to gNB

The present invention provides a base station, BS, for communicating with a user equipment, UE, in a wireless communication system, wherein the BS comprises one or more antenna arrays, each antenna array having a plurality of antenna elements, and wherein the BS is configured to
- transmit to a UE a signal causing the UE to initiate a beam sweep procedure for generating a plurality of UL transmission beams, each UL transmission beam represented by one UE transmit, Tx, beam, or a combination of a plurality of UE Tx beams, and each UE Tx beam associated with or formed by one or more antenna arrays of the UE,
- determine suitable UL transmission beams,
- receive an indication from the UE for which of the UE UL transmission beams generated by the beam sweep procedure a beam correspondence exists with a DL reception beam at the UE, a DL reception beam represented by one UE transmit, Rx, beam, or a combination of a plurality of UE Rx beams, and each UE Rx beam associated with or formed by one or more antenna arrays of the UE, and
- responsive to the received indication, decide if beam correspondence is established or a DL beam sweeping procedure needs to be initiated at the BS.

System

The present invention provides a wireless communication network, comprising at least one of the inventive UEs and at least one of the inventive base stations.

In accordance with embodiments, the communication device and the transmitter comprises one or more of: a mobile terminal, or stationary terminal, or cellular IoT-UE, or an IoT device, or a ground based vehicle, or an aerial vehicle, or a drone, or a moving base station, or road side unit, or a building, or a macro cell base station, or a small cell base station, or a road side unit, or a UE, or a remote radio head, or an AMF, or an SMF, or a core network entity, or a network slice as in the NR or 5G core context, or any transmission/reception point (TRP) enabling an item or a device to communicate using the wireless communication network, the item or device being provided with network connectivity to communicate using the wireless communication network.

Methods

(a) Beam Correspondence Capability Indicated as UE Feature

The present invention provides a method in a wireless communication system comprising a user equipment, UE, and a base station, BS, wherein the UE comprises one or more antenna arrays, each antenna array having a plurality of antenna elements, the method comprising:
- signaling from the UE to the BS, dependent on a configuration of the one or more antenna arrays of the UE, whether the UE supports beam correspondence or not.

(b) Beam Correspondence Indication for Beam Reporting/Beam Correspondence Signaling for Uplink Beam Sweeping The present invention provides a method in a wireless communication system comprising a user equipment, UE, and a base station, BS, wherein the BS transmits a plurality of BS transmit beams for a downlink, DL, transmission, and wherein the UE comprises one or more antenna arrays, each antenna array having a plurality of antenna elements, the method comprising:
- responsive to a plurality of BS downlink, DL, transmission beams transmitted by the BS, determining, at the UE, one or more DL reception beams, wherein each DL reception beam is associated with a DL transmission beam from the BS, the DL reception beam being represented by a UE Rx beam or a combination of a plurality of UE Rx beams, wherein each UE Rx beam is formed by one or more of the antenna arrays, and wherein the UE supports either full beam correspondence, no beam correspondence, or partial beam correspondence, and
- signaling to the BS a beam report about the one or more DL reception beams so as to allow the BS to identify one or more associated BS transmission, Tx, beams for a DL transmission to the UE.

The present invention provides a method in a wireless communication system comprising a user equipment, UE, and a base station, BS, wherein the UE comprises one or more antenna arrays, each antenna array having a plurality of antenna elements, the method comprising:
- responsive to a plurality of BS downlink, DL, transmission beams transmitted by the BS, determining, at the UE, one or more DL reception beams, wherein each DL reception beam is associated with a DL transmission beam from the BS, the DL reception beam being represented by a UE Rx beam or a combination of a plurality of UE Rx beams, wherein each UE Rx beam is formed by one or more of the antenna arrays, and wherein for a DL reception beam either a beam correspondence, no beam correspondence, or a partial beam correspondence with an uplink, UL, transmission exists, and
- signaling to the BS a beam report about the one or more DL reception beams so as to allow the BS to identify one or more associated BS transmission, Tx, beams for a DL transmission to the UE.

The present invention provides a method in a wireless communication system comprising a user equipment, UE, and a base station, BS, wherein the UE comprises one or more antenna arrays, each antenna array having a plurality of antenna elements, the method comprising:
- receiving, at the UE, a beam sweep signal from the BS, responsive to the beam sweep signal from the BS, initiating, at the UE, a beam sweep procedure for generating a plurality of UL transmission beams so as to allow the BS to determine one or more UL reception beams and to report one or more UL transmission beams to the UE which are suitable for the UL transmission, and reporting for one or more UL transmission beams indicated by the BS a beam correspondence bitmap, the beam correspondence bitmap comprising a set of binary flags, each flag indicating if for a UL transmission beam a beam correspondence with a DL reception exists or not.

The present invention provides a method in a wireless communication system comprising a user equipment, UE, and a base station, BS, wherein the BS comprises one or more antenna arrays, each antenna array having a plurality of antenna elements, the method comprising:

transmitting, by the BS, a plurality of BS downlink, DL, transmission beams, receiving, at the BS, from a UE a beam report about one or more DL reception beams at the UE, the one or more DL reception beams being associated with the DL transmission beams received at the UE, and the UE supporting either full beam correspondence, no beam correspondence, or partial beam correspondence; and responsive to the beam report, identifying at the BS one or more associated BS transmission, Tx, beams for a DL transmission to the UE.

The present invention provides a method in a wireless communication system comprising a user equipment, UE, and a base station, BS, wherein the BS comprises one or more antenna arrays, each antenna array having a plurality of antenna elements, the method comprising:

transmitting, by the BS, a plurality of BS downlink, DL, transmission beams, receiving from a UE a beam report about one or more DL reception beams at the UE, the one or more DL reception beams being associated with the DL transmission beams received at the UE, wherein for a DL reception beam either a beam correspondence, no beam correspondence, or a partial beam correspondence with an uplink, UL, transmission exists; and responsive to the beam report, identifying one or more associated BS transmission, Tx, beams for a DL transmission to the UE.

The present invention provides a method in a wireless communication system comprising a user equipment, UE, and a base station, BS, wherein the BS comprises one or more antenna arrays, each antenna array having a plurality of antenna elements, the method comprising:

signaling, by the BS, to the UE to initiate a beam sweep procedure for generating a plurality of UL transmission beams, determine, at the UE, one or more UL reception beams; and reporting, by the BS, one or more UL transmission beams to the UE which are suitable for the UL transmission, and receiving, at the BS, from the UE a beam correspondence bitmap, the beam correspondence bitmap comprising a set of binary flags, each flag indicating if for a reported UL transmission beam a beam correspondence with a DL reception at the UE exists or not.

(c) Beam Correspondence Signaling for Uplink Beam Sweeping

The present invention provides a method in a wireless communication system comprising a user equipment, UE, and a base station, BS, wherein the UE comprises one or more antenna arrays, each antenna array having a plurality of antenna elements, the method comprising:

receiving, at the UE, a beam sweep signal from the BS, responsive to the beam sweep signal, initiating, at the UE, a beam sweep procedure for generating a plurality of UL transmission beams so as to allow the BS to determine one or more UL transmission beams which are suitable for the UL transmission, wherein each UL transmission beam is represented by one UE transmit, Tx, beam, or a combination of a plurality of UE Tx beams, each UE Tx beam associated with or formed by one or more antenna arrays, and wherein only those UL transmission beams are used in the beam sweep procedure for which an associated DL reception beam exist, a DL reception beam represented by one UE receive, Rx, beam, or a combination of a plurality of UE Rx beams, and each UE Rx beam associated with or formed by one or more antenna arrays, and determining, using the antenna arrays, one or more associated DL reception beams for a downlink reception corresponding to the indicated UL transmission beams.

(d) Beam Correspondence Indication in UL Beam Report to gNB

The present invention provides a method in a wireless communication system comprising a user equipment, UE, and a base station, BS, wherein the UE comprises one or more antenna arrays, each antenna array having a plurality of antenna elements, the method comprising:

receiving, at the UE, a beam sweep signal from the BS, responsive to the beam sweep signal, initiating a beam sweep procedure for generating a plurality of UL transmission beams so as to allow the BS to determine one or more UL transmissions beams, and to report one or more UL transmission beams to the UE which are suitable for the UL transmission, wherein each UL transmission beam is represented by one UE transmit, Tx, beam, or a combination of a plurality of UE Tx beams, each UE Tx beam associated with or formed by one or more antenna arrays, and wherein each UL transmission beam has an associated DL reception beam, a DL reception beam represented by one UE receive, Rx, beam, or a combination of a plurality of UE Rx beams, each UE Rx beam associated with of formed by one or more antenna arrays, and providing an indication which of the UL transmission beams generated by the beam sweep procedure has an associated DL reception beam at the UE so as to allow the BS to decide if beam correspondence at the BS is established or a DL beam sweeping procedure needs to be initiated at the BS.

The present invention provides a method in a wireless communication system comprising a user equipment, UE, and a base station, BS, wherein the BS comprises one or more antenna arrays, each antenna array having a plurality of antenna elements, the method comprising:

transmitting, by the BS, to a UE a signal causing the UE to initiate a beam sweep procedure for generating a plurality of UL transmission beams, each UL transmission beam represented by one UE transmit, Tx, beam, or a combination of a plurality of UE Tx beams, and each UE Tx beam associated with or formed by one or more antenna arrays of the UE, determine, at the BS, suitable UL transmission beams, receiving, at the BS, an indication from the UE for which of the UE UL transmission beams generated by the beam sweep procedure a beam correspondence exists with a DL reception beam at the UE, a DL reception beam represented by one UE transmit, Rx, beam, or a combination of a plurality of UE Rx beams, and each UE Rx beam associated with or formed by one or more antenna arrays of the UE, and responsive to the received indication, deciding, at the BS, if beam correspondence is established or a DL beam sweeping procedure needs to be initiated at the BS.

(e) Selective Use of a Selected Uplink Transmission Beam

The present invention provides a method in a wireless communication system comprising a user equipment, UE, and a base station, BS, wherein the UE comprises one or more antenna arrays, each antenna array having a plurality of antenna elements, the method comprising:

receiving, at the UE, one or more DL transmission beams from the BS;

selecting an UL transmission beam for the UL communication with the BS, determining whether one or more certain regulatory requirements or constraints prohibit the use of the selected UL transmission beam, in case there are no regulatory requirements or constraints prohibiting the use of the selected UL transmission beam, using the selected UL transmission beam for the UL communication with the BS, and in case there are regulatory requirements or constraints prohibiting the use of the selected UL transmission beam, selecting for the UL communication with the BS another UL transmission beam for which no regulatory requirements or constraints exist.

Computer Program Product

The present invention provides a computer program product comprising instructions which, when the program is executed by a computer, causes the computer to carry out one or more methods in accordance with the present invention.

In accordance with embodiments of the inventive approach, the UE may be configured with a RS resource configuration and a CSI report configuration allowing for a beam reporting, and for example, the RS may be a SSB and/or a CSI-RS. The downlink RS may be a beam-formed signal to cover different spatial directions (see FIG. 3 above) so as to achieve a certain spatial cell coverage. For example, the DL transmission beams may be transmitted by the gNB in a beam sweeping operation in different directions, for example, a first DL transmission beam may be transmitted in a first direction, a second DL transmission beam may be transmitted in a second direction, a third DL transmission beam may be directed in a third direction, and so on. Each DL transmission beam may have associated therewith a certain RS resource or port, for example, the first DL transmission beam has associated therewith a first RS resource/port, the second DL transmission beam has associated therewith a second RS resource/port, and so on. The RS resource/port is, therefore, an indicator for identifying a DL transmission beam and distinguishing the DL transmission beam from the other DL transmission beams transmitted by the gNB. Furthermore, the DL transmission beams may be time division multiplexed in different symbol periods or slots of a sub-frame (see FIG. 2 above). For example, the first DL transmission beam may be transmitted in a first symbol period, the second DL transmission beam may be transmitted in a second symbol period, and so on. The beams may also be frequency division multiplexed. The pilots may be time or frequency or code division multiplexed as stated in Rel. 15.

Figure 5:
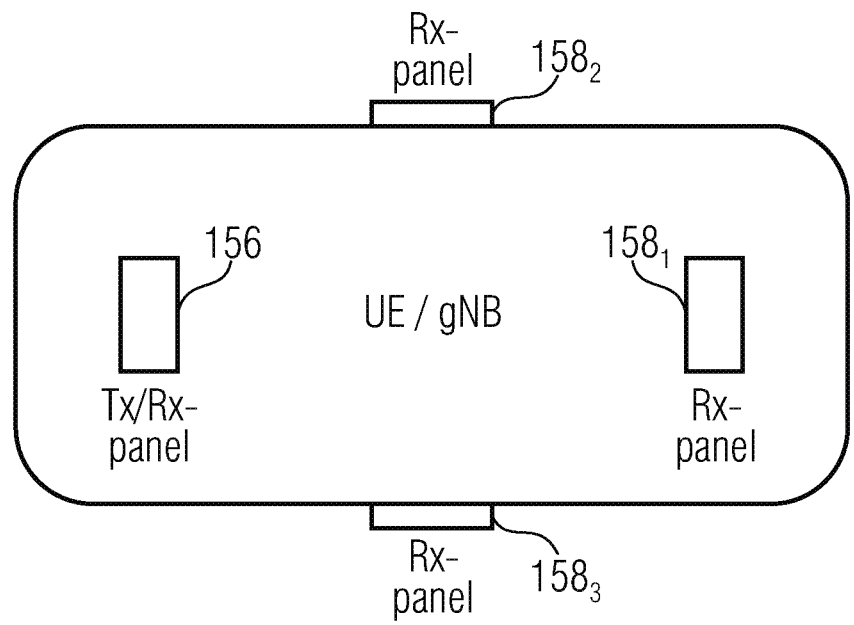
FIG. 5 is a schematic representation of an example of a UE/gNB including different antenna arrays placed at different locations.
Figure 7:
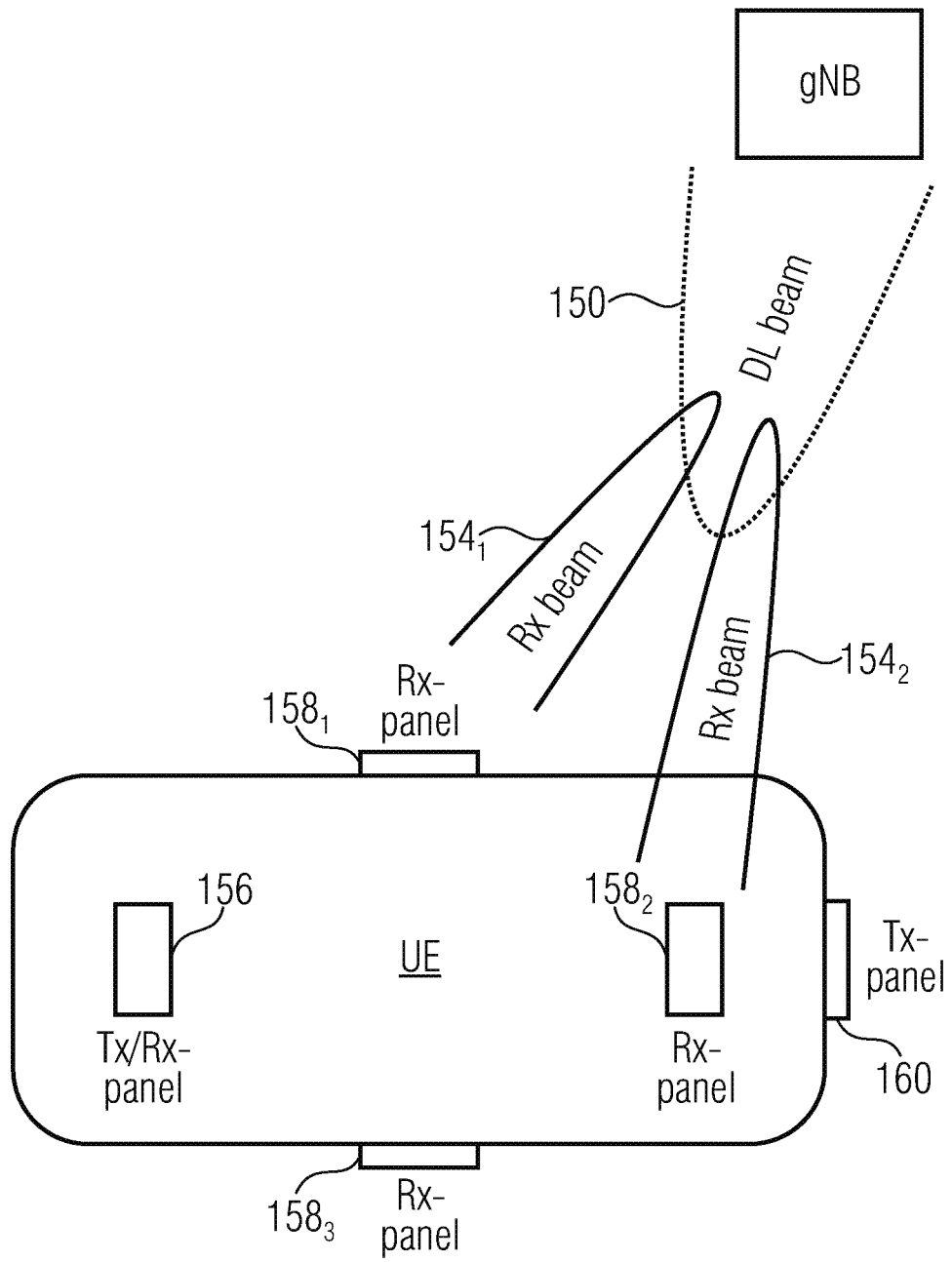
FIG. 7 illustrates an embodiment of receiving at a UE a DL reception beam from a base station BS or gNB.

The UE performs measurements on the received downlink beam-formed reference signals and may identify one or more DL reception beams associated with the DL transmission beams. A DL reception beam is represented by one UE receive, Rx, beam or by a combination of a plurality of UE Rx beams. FIG. 7 illustrates an embodiment of a DL reception beam received at a UE from a base station BS or gNB. Similar as in FIG. 5, the UE has a plurality of antennas or antenna arrays of which the antenna array 156 is a Tx/Rx antenna array as described above, and antenna arrays $158_1$ to $158_3$ are Rx antenna arrays as mentioned above. The UE comprises an additional Tx antenna array 160 including antennas or antennas arrays with elements which are used solely for transmitting. FIG. 7 illustrates, schematically, a DL transmission beam 150 transmitted by the base station gNB towards the UE, for example by applying beamforming using respective antenna elements at the base station gNB. The DL transmission beam 150 is received at the UE at the Rx antenna arrays $158_1$ and $158_2$ by respective Rx beams $154_1$ and $154_2$. Thus, the DL reception beam at the UE is represented by the two Rx beams $154_1$ and $154_2$. Naturally, in accordance with other embodiments, the DL reception beam may comprise or be represented only by a single Rx beam, or by more than the two illustrated Rx beams, for example, dependent on the antenna arrays or antenna elements provided at the UE.

The UE may be configured by the gNB with a CSI report configuration for beam reporting. Such a beam report may contain an indication of the quality or strength of the DL reception beam(s) at the UE. For example, in FIG. 7, the UE may perform measurements of reference signals associated with the DL transmission beam 150 which are received at the UE using the Rx beams $154_1$ and $154_2$ via the Rx antenna arrays $158_1$ and $158_2$. By means of the signal processor described above with reference to FIG. 6 and on the basis of the signals received at the respective RF receivers associated with the Rx antenna arrays $158_1$ and $158_2$, a value representing a quality or a strength of the DL reception beam $154_1/154_2$ may be determined. The quality or strength of the DL reception beam(s) may be represented by a set of reference signal received power, RSRP, values. In accordance with other embodiments, the quality or strength of the received signal(s) on the RX beams $154_1$, $154_2$ defining the DL reception beam may be represented by one of or combinations of the following:

a received signal strength indicator, RSSI,
a reference signal received power, RSRP,
a reference signal received signal quality, RSRQ,
a signal-to-noise-ratio, SNR,
a signal-to-interference-plus-noise ratio, SINR.

When considering the embodiment of FIG. 7, at the UE there may be a beam correspondence, a partial beam correspondence or no beam correspondence, for example dependent on a property of the one or more antenna arrays. For example, when considering a situation as in FIG. 7 in which the base station gNB transmits a DL transmission beam 150 towards the UE, a DL reception beam at the UE, which is associated with a DL transmission beam from the gNB, may be represented by a single UE Rx beam or by a combination of a plurality of Rx beams at the UE, and each UE Rx beam is formed by one or more of the antenna arrays. FIG. 8 illustrates situations of no beam correspondence (FIG. 8(a)), partial beam correspondence (FIG. 8(b) and FIG. 8(c)) or beam correspondence (FIG. 8(d)). The UE is similar to one in FIG. 7 except that the additional Tx antenna array 160 is not provided. Like in FIG. 7, the base station gNB transmits a DL transmission beam 150 towards the UE and the corresponding DL reception beam at the UE is formed or comprises the two UE Rx beams $154_1$ and $154_2$.

Figure 8B:
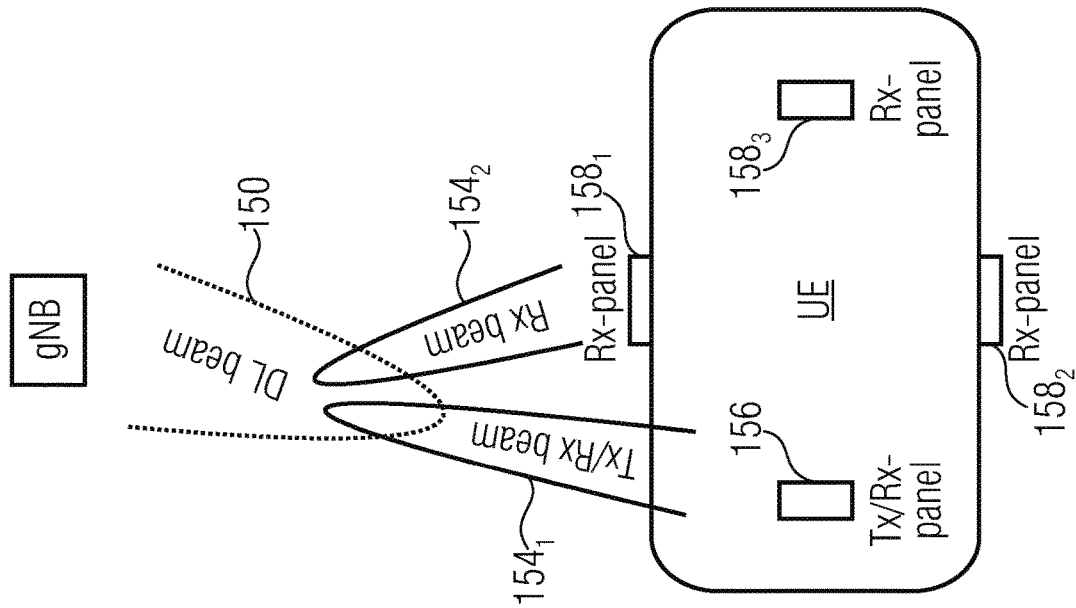
FIG. 8b illustrates an example of partial beam correspondence.
Figure 8A:
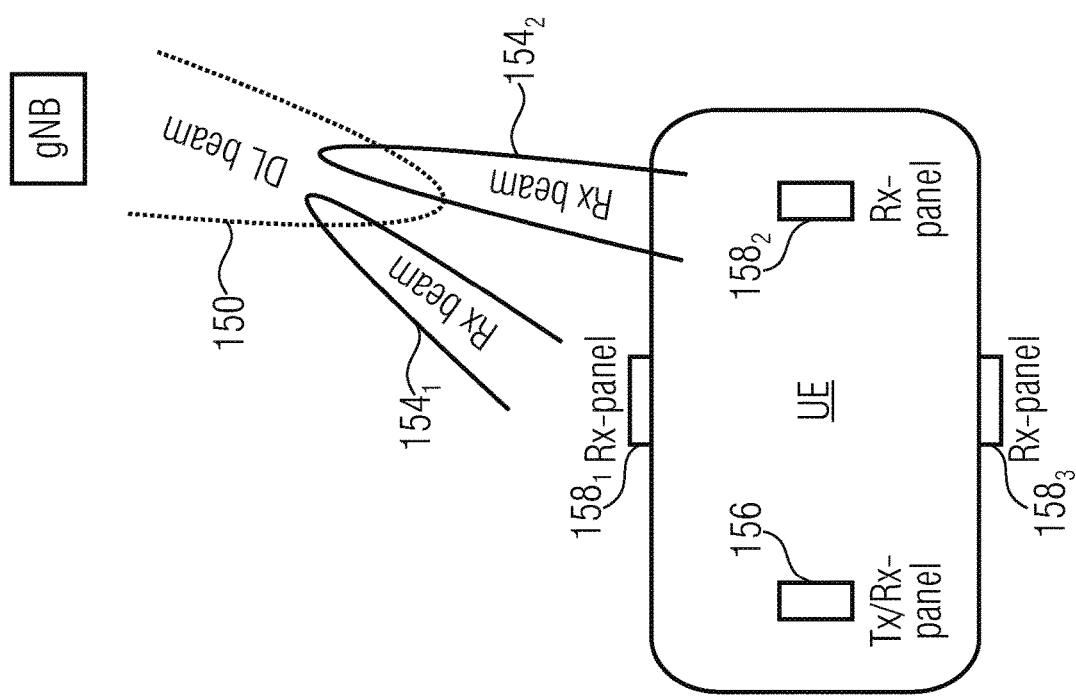
FIG. 8a illustrates an example of no beam correspondence.

FIG. 8(a) illustrates the case of no beam correspondence with an uplink, UL, transmission performed by the UE. In this case, the UE does not identify for any of the reception beams an associated UL transmission beam. In the embodiment of FIG. 8(a), the DL transmission beam 150 is only received by a DL reception beam, represented by a combination of UE Rx beams $154_1$ and $154_2$ formed by the Rx antenna arrays $158_1$ and $158_2$, respectively, i.e., by the antenna arrays that are used solely for signal reception and which are not used for generating one or more UE transmit, Tx, beams towards the base station. Thus, in the embodiment of FIG. 8(a) it is not possible to form by the antenna arrays $158_1$ and $158_2$, or by any other antenna array an UL transmission beam, which is formed by one UE Tx beam, or a combination of a plurality of UE Tx beams, that correspond to the respective DL reception beam, represented by a combination of the UE Rx beams $154_1$ and $154_2$, so that beam correspondence does not exist.

FIG. 8(b) illustrates the case of a partial beam correspondence for a DL reception beam. The DL reception beam is formed, again, by a combination of the two Rx beams $154_1$, $154_2$ which, other than in FIG. 8(a), originate from the Tx/Rx antenna array 156 and from the Rx antenna array $158_1$, respectively. For the Rx beam $154_2$ no corresponding UE Tx beam exists as, for example, the Rx antenna array $158_1$ is only used for receiving signals and not for providing a UE Tx beam. Thus, it is not possible to form by the antenna array $158_1$ or by any other antenna array a UE Tx beam that corresponds to the UE Rx beam $154_2$. However, the Tx/Rx antenna array 156 is used both for transmission and reception so that for the UE Rx beam $154_1$ a corresponding UE Tx beam may be formed using the antenna elements of the Tx/Rx antenna array 156. For example, a UE Tx beam may be formed which points for example to the same spatial direction and possibly has at least the same beam width as the UE Rx beam. In this case, a partial beam correspondence exists.

Figure 8D:
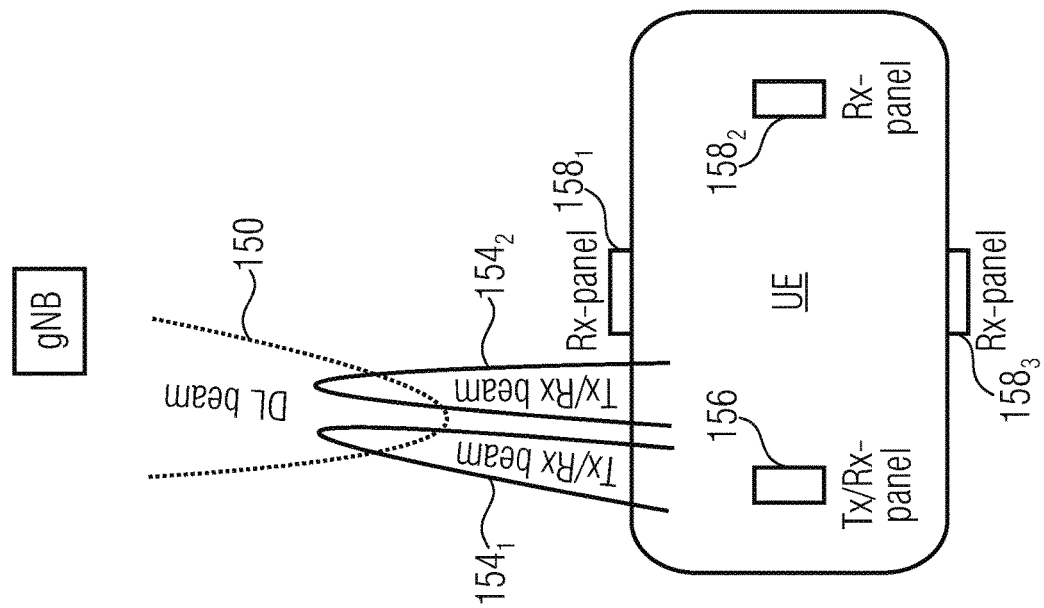
FIG. 8d illustrates an example of beam correspondence.
Figure 8C:
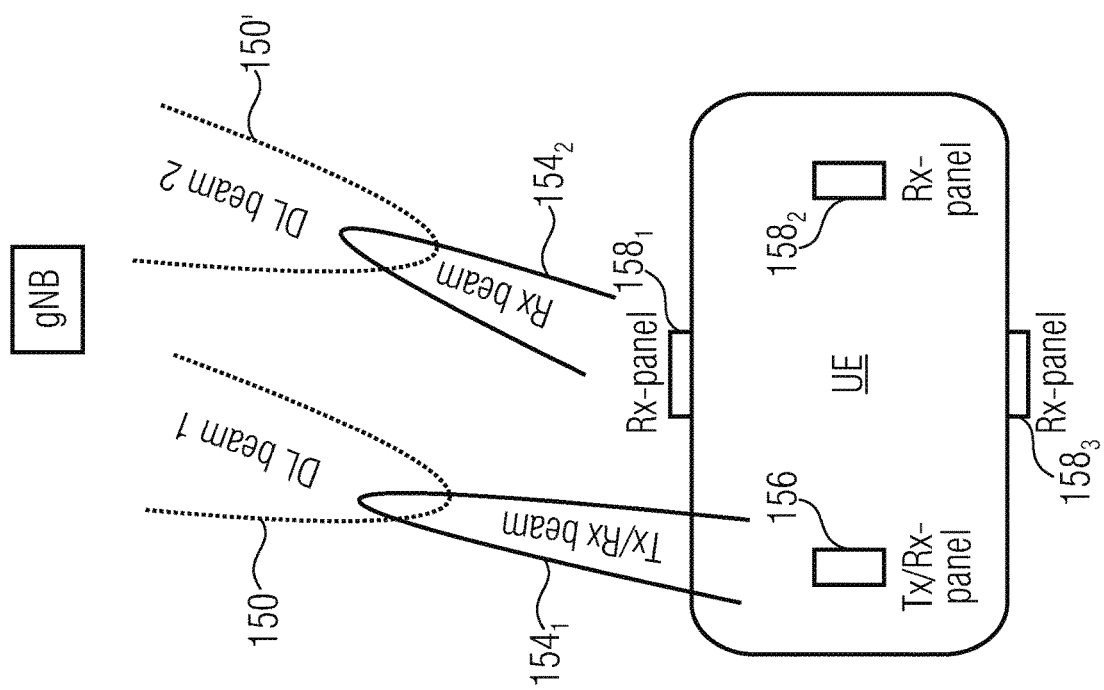
FIG. 8c illustrates an example of partial beam correspondence.

Another embodiment for a partial beam correspondence is illustrated in the embodiment of FIG. 8(c). Two DL transmission beams 150, 150' are transmitted from the base station gNB towards the UE. A first DL reception beam is formed or represented by the UE Rx beam $154_1$, and a second downlink reception beam is formed or represented by the UE Rx beam $154_2$. In other embodiments, the DL reception beams may be formed by a plurality of respective UE Rx beams generated by the respective antenna arrays of the UE. For the first DL transmission beam 150, the corresponding DL reception beam is represented by the UE Rx beam $154_1$ formed with the Tx/Rx antenna array 156 which allows for generating a corresponding UE Tx beam so that for the DL reception beam the UE provides beam correspondence with the UL transmission. However, the DL reception beam for the second downlink beam 150' is formed by the UE Rx beam $154_2$ originating from the Rx antenna array $158_1$ and no corresponding UL transmission beam may be formed, as the Rx antenna array is only used for signal reception, so that there is no beam correspondence with regard to the second DL reception beam. In the embodiment of FIG. 8(c) the UE supports a partial beam correspondence, like in the embodiment of FIG. 8(b).

FIG. 8(d) shows an embodiment in which for the DL reception beam, associated with the DL transmission beam 150, beam correspondence with the UL transmission is provided. More specifically, the DL reception beam is formed by a combination of the UE Rx beams $154_1$, $154_2$ originating, for example, from the Tx/Rx antenna array 156, so that it is possible to provide for the combination of both UE Rx beams a corresponding UL transmission beam formed by a combination of two UE Tx beams so that a beam correspondence exists.

In the embodiments described so far, Tx/Rx antenna arrays have been described to be able to provide corresponding Tx beams/Rx beams. In accordance with other embodiments this may also be achieved by separate Tx antenna arrays and Rx antenna arrays provided at a known relationship with respect to each other, for example, in proximity to each other, and by applying an appropriate calibration so that, for example, neighboring Tx antenna arrays and Rx antenna arrays may provide for a beam correspondence despite the fact that the respective antenna arrays are used solely for transmission and reception, respectively.

Thus, the UE may signal full beam correspondence if the UE supports beam correspondence between UL and DL transmissions in all cases. The UE signals no beam correspondence if the UE supports no beam correspondence between the UL transmission and the DL transmission, and the UE signals partial beam correspondence if the UE supports partial beam correspondence between the UL and DL transmissions.

In accordance with embodiments, a Rx beam and a Tx beam provided by the UE are considered to correspond to each other or to be associated with each other so as to provide beam correspondence when one or more of a plurality of predefined beam properties are given, like beam direction, a beam width, a beam shape or a correlation value indicative of a correlation of the Rx beam and the Tx beam. For example, the beam direction may be determined as the angle of arrival or the angle of departure of a beam which, to indicate beam correspondence, may be substantially identical or may be at least within a certain predefined range. In accordance with other embodiments, beam correspondence may be assumed when the Tx beam at the UE has a width being equal to or smaller than the Rx beam width. A beam correspondence may also be assumed when a correlation of a number of parameters of the Rx beam and the Tx beam are correlated so that a full correlation or a correlation above a predefined value or threshold is determined. A beam correspondence may also be assumed when the angular spectrum or shape of the Rx beam and Tx beam, also forming beams in multiple directions, is similar.

In accordance with embodiments, a UE may receive one or more DL transmission beams, generated by the gNB, wherein each DL reception beam of the UE is represented by one UE Rx beam or a combination of a plurality of UE Rx beams, formed with the respective antenna arrays of the UE. Each UE Rx beam is associated with a single or multiple antenna arrays of the UE. Responsive to receiving one or more DL transmission beams, the UE may signal to the gNB that one or more DL transmission beams have been received and, responsive to this signaling, the gNB may identify one or more DL transmission beams and, in case of beam correspondence at the UE with the UL transmission, the UE may identify for an indicated DL reception beam by the gNB associated with a DL transmission beam an associated UL transmission beam and, in case no such correspondence may be determined, no beam correspondence with the UL transmission exists.

In accordance with embodiments, a UE may transmit one or more UL transmission beams, each represented by one UE Tx beam or a combination of a plurality of UE Tx beams, generated by the respective antenna arrays of the UE. A UE Tx beam is associated with a single or multiple antenna arrays of the UE. Responsive to receiving such a UL transmission beam, the gNB may signal to the UE that one or more UL transmission beams have been received and, responsive to this signaling, the UE may identify one or more DL reception beams and, in case of a beam correspondence with the DL reception, the UE identifies for an indicated UL transmission beam by the gNB, an associated DL reception beam, and in case no such correspondence may be determined, no beam correspondence with the DL reception exists.

Beam Correspondence Capability Indicated as UE Feature

In accordance with embodiments of the present invention, the beam correspondence capabilities of a UE may be indicated by the UE as a feature. The UE may be equipped with a plurality of antenna arrays, for example in a way as described above with reference to FIGS. 5, 7 and 8, which are used for signal transmission and signal reception. For example, the UE may be equipped with one or more combined Tx/Rx antenna arrays 156 that are used for both signal reception and transmission. The UE may also be equipped with one or more Rx antenna arrays 158 used solely for signal reception. Such Rx antenna arrays 158 are not involved in signal transmission and may be used only for reception diversity to improve the received signal quality at the UE in terms of, for example, signal-to-noise-ratio, SNR. The UE may also be equipped with one or more Tx antenna arrays 160 used solely for signal transmission. Each Rx antenna array 158 may be equipped with a single or a plurality of RF receiver branches, and each Tx antenna array 160 may be equipped with a single or with a plurality of RF transmitter branches. The Tx/Rx antenna arrays of the UE may have different implementations. For example, an RF transmitter and an RF receiver associated with a Tx/Rx antenna array 156 may share the same physical antennas, and the UE needs to switch between transmission and reception. In another embodiment, a Tx/Rx antenna array may be equipped with separate physical antennas for the transmit and receive directions to avoid the switching between transmission and reception. Dependent on the antenna array configuration, antenna array implementation and the level of available antenna array calibration (e.g., for compensating distances between respective antennas or antenna arrays or for compensating hardware differences), a Tx/Rx antenna array or combinations of certain individual Tx antenna arrays and Rx antenna arrays may support beam correspondence or not. Thus, in accordance with embodiments of the inventive approach, different UE antenna array categories may be introduced with respect to the beam correspondence support. For example, each antenna array of a UE may be classified into:

- a Rx antenna array with associated Tx antenna array (as part of a Tx/Rx antenna array or as part of a combination of separate Rx and Tx antenna arrays) supporting beam correspondence,
- a Rx antenna array with associated Tx antenna array (as part of a Tx/Rx antenna array or as part of a combination of separate Rx and Tx antenna arrays) not supporting beam correspondence,
- a Rx antenna array without associated Tx antenna array not supporting beam correspondence, or
- a Tx antenna array without associated Rx antenna array not supporting beam correspondence.

The UE may signal to the base station, dependent on a property of the one or more antenna arrays, whether the UE supports full beam correspondence, partial beam correspondence or no beam correspondence.

Partial Beam Correspondence with Respect to One DL Transmission Beam

In accordance with an embodiment, partial beam correspondence may exist when considering only the DL transmission beam. In accordance with such embodiments, the gNB may transmit a plurality of downlink, DL, transmission beams, like the DL transmission beams 150 illustrated in FIG. 8. The UE, responsive to receiving the DL transmission beams 150 from the BS, determines one or more DL reception beams each being associated with a respective DL transmission beam 150 from the BS. As described above also with reference to FIG. 8, the DL reception beam is represented by an UE receive, Rx, beam or by a combination of a plurality of UE Rx beams 154. Each UE Rx 154 beam may be formed by one or more of the antenna arrays 156 to 158 in FIG. 8.

In case of a full beam correspondence with an uplink, UL, transmission, the UE identifies for each determined DL reception beam an associated UL transmission beam, as is illustrated in FIG. 8(*d*). The UL transmission beam being represented by an UE transmit, Tx, beam or by a combination of a plurality of UE Tx beams, wherein each UE Tx beam is formed by one or more of the antenna arrays.

In case of no beam correspondence with the UL transmission, the UE does not identify for any of the DL reception beams an associated UL transmission beam, as is illustrated in FIG. 8(*a*).

In case of partial beam correspondence with the UL transmission, the UE identifies for a DL reception beam an UL transmission beam being represented by a plurality of UE Tx beams, as is illustrated in FIG. 8(*b*). For a first set of the UE Rx beams 154$_2$ the UE does not identify an associated UL transmission beam being represented by a UE transmit, Tx, beam or by a combination of a plurality of UE Tx beams so that a beam correspondence does not exist. For a second set of the UE Rx beams 154$_1$ the UE identifies an associated UL transmission beam being represented by an UE transmit, Tx, beam or by a combination of a plurality of UE Tx beams so that a beam correspondence exists. In the example described above, the first and second sets included only one beam, however, in accordance with other embodiments, more than one Rx beam may be in either one of the sets. For example, in the first set a further Rx beam provided by another antenna array, like antenna array 158$_2$, and in the second set a further Rx beam provided by another Tx/Rx antenna array provided at the UE.

Partial Beam Correspondence with Respect to a Plurality of DL Transmission Beams In accordance with an embodiment, partial beam correspondence may exist when considering a plurality of DL transmission beams. In accordance with such embodiments, like in the embodiment above, the gNB may transmit a plurality of downlink, DL, transmission beams, like the DL transmission beams 150 illustrated in FIG. 8. The UE, responsive to receiving the DL transmission beams 150 from the BS, determines one or more DL reception beams each being associated with a respective DL transmission beam 150 from the BS.

In case of a full beam correspondence or no beam correspondence with an uplink, UL, transmission, like in the embodiment above, the UE identifies for each determined DL reception beam an associated UL transmission beam or no associated UL transmission beam.

Other than in the embodiment above, in case of partial beam correspondence with the UL transmission, the UE identifies, as is illustrated in FIG. 8(c), for a first DL reception beam 150 an associated UL transmission beam so that beam correspondence exists, and the UE does not identify for a second DL reception beam 150' an associated UL transmission beam so that beam correspondence does not exist.

In the above described embodiments, the gNB transmitted one or more respective DL transmission beams 150, 150', responsive to which the UE determined the associated DL receptions beams and whether corresponding Tx beams may be provided. The inventive approach is not limited to such embodiments, rather, in accordance with yet further embodiments, the UE may transmit a plurality of UL transmission beams towards the gNB. The gNB receives and identifies the UL transmission beams received from the UE. The gNB signals to the UE, e.g., in a beam report message and/or using a BC bitmap, the UL transmission beams the gNB received. Responsive to a signaling from the BS, the UE identifies one or more DL reception beams corresponding to the signaled UL transmission beams. In case of full beam correspondence with DL reception, the UE identifies for an indicated UL transmission beam an associated DL reception beam, and in case of no beam correspondence with DL reception, the UE does not identify for an indicated UL transmission beam an associated DL reception beam.

In accordance with embodiments, the UE may signal
full beam correspondence if the UE supports beam correspondence with the UL transmission and/or the UE supports beam correspondence with the DL transmission,
no beam correspondence if the UE supports no beam correspondence with the UL transmission and the UE supports no beam correspondence with the DL transmission, and
partial beam correspondence if the UE supports partial beam correspondence with the UL transmission.

The supported degree of beam correspondence may be signaled by the UE, for example, via a higher layer to the gNB.

In accordance with further embodiments, the supported degree of beam correspondence may be signaled, e.g., as part of the UE capability, dependent on a property of the one or more antenna arrays or dependent on the antenna array implementation. For example, when a UE is equipped with one or more Rx antenna arrays with associated Tx antenna arrays supporting beam correspondence, the UE may signal the support of beam correspondence accordingly. In another embodiment, the UE may be equipped with a plurality of Rx antenna arrays without associated Tx antenna arrays not supporting beam correspondence, and with a plurality of Rx antenna arrays with associated Tx antenna arrays supporting beam correspondence. In such a case, the UE may signal a partial beam correspondence. In another embodiment, the UE may be equipped with the plurality of Tx/Rx antenna arrays not supporting beam correspondence so that the UE signals that there is no beam correspondence, i.e., beam correspondence is not supported.

Beam Correspondence Indication for Beam Reporting

In accordance with embodiments, the UE may be configured to determine a beam report for a plurality of DL transmission beams transmitted by the gNB and received by the UE, and to indicate if for each DL reception beam which is associated with a DL transmission beam in the beam report, a corresponding UL transmission beam exists or not.

Figure 9:
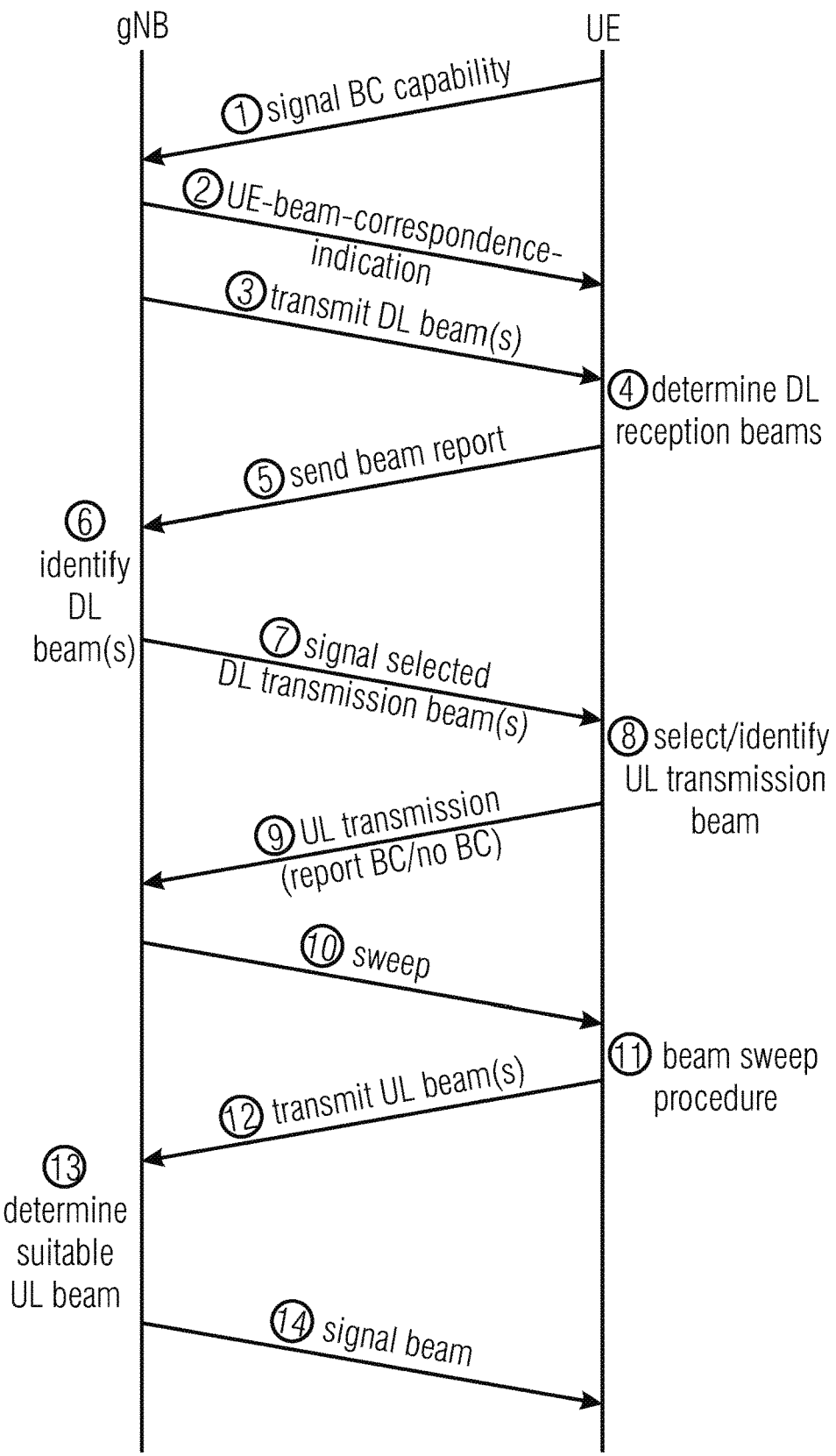
FIG. 9 illustrates a diagram representing an embodiment of the inventive approach for a beam correspondence indication for beam reporting.

FIG. 9 illustrates a diagram representing an embodiment of the inventive approach for a beam correspondence indication for beam reporting. The base station, gNB, may be controlled so as to transmit one or more DL transmission beams, as indicated at step "3". The DL transmission beams are received at the UE using the one or more antenna arrays, for example as described above with reference to FIGS. 5, 7 and 8.

Responsive to the transmission of the DL transmission beams, as indicated at step "4", the UE determines one or more DL reception beams. As described above, each DL reception beam which is associated with a DL transmission beam from the gNB may be represented by a UE Rx beam or by a combination of a plurality of UE Rx beams. Each UE Rx beam may be formed by one or more of the antenna arrays at the UE. As indicated at step "5", the UE generates and transmits a beam report about the one or more DL beams identified at the UE on the basis of which the gNB, as indicated at step "6", may identify one or more DL transmission beams for a downlink transmission towards the UE. As indicated at step "7", the gNB, following the identification or selection of the one or DL transmission beams, may signal the one or more identified DL transmission beams towards the UE.

In accordance with embodiments, the beam report may indicate one or more DL transmission beams identified at the UE, regardless of whether beam correspondence or no beam correspondence exists for an identified DL transmission beam, so that the beam report transmitted at step "5" may not include any indication of beam correspondence or no beam correspondence.

In accordance with other embodiments, as described above with reference to FIG. 8, the UE may determine at step "4" whether, for the determined DL reception beam, a corresponding UL transmission beam for a potential uplink transmission towards to the gNB exists or not, so that the beam report transmitted at step "5" may include for the identified DL transmission beams an indication of beam correspondence or no beam correspondence. In such embodiments the UE may include the indication of beam correspondence or no beam correspondence into the beam report by default, or the UE may operate responsive to a control signal, like a UE-beam-correspondence-indication, that may be signaled from the gNB so as to include into the beam report the indication of beam correspondence or no beam correspondence.

In accordance with further embodiments, the UE may calculate a quality or a strength of a downlink reception beam by analyzing the associated RS received by the one or more RF receiver branches associated with the respective antenna elements or antenna arrays which generate the respective DL reception beam exhibiting beam correspondence with an UL transmission beam. In the embodiments described above in which the UE operates responsive to the UE-beam-correspondence-indication being signaled from the gNB, the beam report sent at step "5" may include strength values for some or all of the DL reception beams, for example a predefined number of the strongest DL reception beams may be used and the corresponding strength values are included into the report sent at step "5" of FIG. 9. In accordance with embodiments, the strength values may be RSRP values, which are sent for the K strongest DL reception beams toward the gNB. An RSRP value of a DL reception beam may be determined by calculating a power value of the associated CSI-RS and/or SSB, as is described, for example, in reference [4]. The CSI-RS and/or SSB resources forming the basis for the calculation of the power value may be received at an RF receiver branch of a Tx/Rx antenna array or a Rx antenna array having associated therewith a Tx antenna array operable so as to provide a Tx beam corresponding the Rx beam so as to provide beam correspondence.

A power value of the RS signal received by the multiple RF transceiver branches may be calculated, using signals from the antennas, which support beam correspondence. In accordance with embodiments, the corresponding RSRP value reported to the gNB should not be lower than the corresponding RSRP value of any of the individual RF receiver branches, as is described, for example, in reference [5].

In the embodiments described above, the UE may receive the control signal, like the UE-beam-correspondence-indication signal from the gNB so as to initiate the beam reporting which allows, for example, to include into the beam report the strongest DL reception beams so as to allow the gNB to identify the one or more DL transmission beams generated by respective antenna arrays at the gNB for a DL transmission from the gNB to the UE.

In accordance with embodiments, initially the UE may signal towards the gNB its beam correspondence capabilities, as indicated at step "1".

In accordance with other embodiments, the gNB may send a control signal to the UE, as indicated at step "2", so as to initiate at the UE the process for determining the one or more DL reception beams. The signaling from the gNB may indicate that during the determination of the DL reception beams, only those DL reception beams are to be considered, for which corresponding beams in the UL transmission exist. The signaling from the gNB may be referred to as a "UE-beam-correspondence-indication", and responsive to this indication, the UE, at step "4" in FIG. 9, may determine the one or more DL reception beams for which corresponding beams with the UL transmission exist.

In one example, the UE may determine each DL reception beam based on a single UE Rx beam, or a combination of a plurality of UE Rx beams, wherein for each of the UE Rx beams a corresponding UE Tx beam with the UL transmission exists. This means, the UE may determine the one or more DL reception beams using only the UE Rx beams associated with antenna arrays where corresponding UE Tx beams exist, for example, as indicated in FIG. 8(d).

In another example, the UE may determine a DL reception beam using a set of UE Rx beams, wherein for each UE Rx beam in the set a corresponding UE Tx beam may exist or not exist. For example, the set of UE Rx beams may be defined by the UE Rx beams $154_1$ and $154_2$ illustrated in FIG. 8(b), where for the UE Rx beam $154_1$ a corresponding UE Tx beam exist and for the UE Rx beam $154_2$ a corresponding UE Tx beam does not exist. In accordance with embodiments, a first quality or strength may be determined for the DL reception beam using the set of UE Rx beams. In addition, a second quality or strength may be determined based on the UE Rx beams out of the set of UE Rx beams for which corresponding UE Tx beams exist. If the first quality or strength reduced by the second quality or strength is below a first threshold value, or if the ratio of the first quality or strength and the second quality or strength is below a second threshold value, beam correspondence with the UL transmission may be determined to exist for the DL reception beam. In the example described above, the set of UE Rx beams includes only two beams, however, in accordance with other embodiments, other numbers of UE Rx beams may be in the set, dependent on whether the DL transmission beam is received by such further Rx beams and/or whether BC for such additional Rx beams exists. For example, the set of UE Rx beams may include a further Rx beam provided by another antenna array, like antenna array $158_2$, in case this antenna array also receives the DL transmission beam, and the second set may include a further Rx beam provided by another Tx/Rx antenna array provided at the UE in case this antenna array also receives the DL transmission beam. In accordance with embodiments, the respective thresholds may be signaled to the UE from the gNB or from the gNB to the UE. In accordance with further embodiments, the UE may report the determined difference or ratio of the first/second quality or strength to the gNB.

In accordance with embodiments, in case the base station has knowledge about the UE antenna configuration, for example in case the antenna configuration is signaled together with the BC capability at step "1" in FIG. 9, the UE-beam-correspondence-indication send at step "2" may explicitly include which of the antenna arrays of the UE are to be used for the beam reporting. However, the present invention is not limited to such embodiments, rather, in accordance with other embodiments, no control signal, like the above-described UE-beam-correspondence-indication may be signaled from the gNB towards the UE. In other words, steps "1" and "2" are optional.

In accordance with embodiments, the UE may include into the beam report sent at step "5" in FIG. 9 an indication of a plurality of DL reception beams received at the UE by any one or any combination of the antennas of the UE, i.e., all or at least some of the DL reception beams, which are above a predefined power value, may be signaled towards the gNB independent of whether beam correspondence exists or not.

In accordance with further embodiments, when receiving the UE-beam-correspondence-indication signal from the base station gNB, the UE may send at step "5" the beam report from which the gNB may identify one or more suitable DL transmission beams exploiting beam correspondence at the UE, i.e., the beam report includes an indication that the UE is capable of determining or selecting one or more UE UL transmission beams. In accordance with embodiments, the gNB may signal to the UE one or more DL transmission beams selected from the one or more DL transmission beams transmitted at step "3" dependent on the received beam report, as indicated at step "7" so that the UE, as indicated at step "8", may select one or more UL transmission beams for the transmission to the gNB which is indicated at step "9" in FIG. 9. The UL transmission beams correspond to the one or more DL reception beams, wherein each DL reception beam is associated with an indicated DL transmission beam by the gNB. As explained above, the UL transmission beam is represented by a UE Tx beam, or a combination of a plurality of UE Tx beams, provided by one or more of the antenna arrays of the UE, for example, by the Tx antenna arrays and/or the Rx/Tx antenna arrays providing beam correspondence.

However, there may be cases in which the UE may not be able to determine for the DL transmission beam selected by the gNB for the downlink transmission a suitable or corresponding UL transmission beam for the uplink transmission exhibiting beam correspondence. In other words, at step "8" in FIG. 9, the UE determines that for the DL reception beam corresponding to the DL transmission beam signaled by the gNB at step "7", no UL transmission beam having beam correspondence exists. In such a case, at step "9", the UE signals towards the gNB that for the selected DL transmission beam no beam correspondence exists. Responsive to receiving the report at step "9" indicating no beam correspondence, the gNB signals at step "10" to the UE to perform a beam sweep procedure. The beam sweep procedure causes the UE, in a similar way as the gNB at step "3" of FIG. 9 to transmit one or more UL transmission beams including, for example, pilot signals like SRS, DM-RS and the like, as is indicated at steps "11" and "12". On the basis of the pilot signals, the gNB" determines at step "13" one or more of the UL transmission beams of the UE which are considered suitable for the UL transmission and signals them at step "14" to the UE so as to allow the UE to use the signaled UL transmission beam for the uplink communication with the gNB.

Beam Correspondence Indication via a Bitmap for Beam Reporting

In the embodiments described above, the beam report provided from the UE towards the gNB or the beam report provided from the gNB towards the UE may include an indication of respective beams that may be generated at the UE or at the gNB so as to provide for beam correspondence or partial beam correspondence. Some of the above embodiments indicate explicitly the DL reception beams for which beam correspondence exists while other embodiments only indicated the available DL reception beams, for example a subset of the received DL reception beams at the UE, like the K strongest DL reception beams. In the former case, instead of explicitly signaling the beams suitable for beam correspondence, and in the latter case in addition to the beam report provided by the UE or by the gNB, the UE or the gNB may determine for the beams to be included into the report, in addition, a bitmap, also referred to as a "beam correspondence bitmap" which may be based on respective beam measurements. The bitmap may comprise a set of binary flags, and each flag may indicate if for a reported beam provided by the UE or by the gNB for transmitting data, a correspondence with a respective transmission beam exists or not.

In accordance with embodiments, beam correspondence or partial beam correspondence may be determined to exist at the UE in case a quality or a strength for a reported downlink reception beam exceeds a certain, predetermined level or threshold. The quality or the strength may be obtained by beam measurements of respective Rx beams supporting beam correspondence.

In accordance with embodiments, a first quality or strength for a reported DL beam is determined using a set of UE Rx beams which represent or define the reported DL transmission beam, wherein for each UE Rx beam in the set a corresponding UE Tx beam with the UL transmission may exist or not exist. For example, the set of UE Rx beams may comprise the UE Rx beam $154_1$ and the UE Rx beam $154_2$ illustrated in FIG. 8(b). A second quality or strength for the reported DL transmission beam is calculated or determined using the UE Rx beams out of the set of UE Rx beams for which corresponding UE Tx beams with the UL transmission exist, for example, the UE Rx beam $154_1$ illustrated in FIG. 8(b). If the first quality or strength reduced by the second quality or strength is below a first threshold value, or if the ratio of the first quality or strength and the second quality or strength is below a second threshold value, beam correspondence with the UL transmission may be determined to exist for the DL reception beam. A flag in the beam map indicating that beam correspondence exists is set if the first quality or strength reduced by the second quality or strength is below a first threshold value, or if the ratio of the first quality or strength and the second quality or strength is below a second threshold value. In accordance with embodiments, the respective thresholds may be signaled to the UE from the gNB or from the gNB to the UE. In accordance with further embodiments, the UE may report the determined difference or ratio of the first/second quality or strength to the gNB.

In the example described above, the set of UE Rx beams includes only two beams, however, in accordance with other embodiments, other numbers of UE Rx beams may be in the set, dependent on whether the DL transmission beam is received by such further Rx beams and/or whether BC for such additional Rx beams exists. For example, the set of UE Rx beams may include a further Rx beam provided by another antenna array, like antenna array $158_2$, in case this antenna array also receives the DL transmission beam, and the second set may include a further Rx beam provided by another Tx/Rx antenna array provided at the UE in case this antenna array also receives the DL transmission beam.

In accordance with embodiments, the quality or strength of a DL reception beam may be calculated by analyzing respective reference signals transmitted by the gNB and received at the respective RF receiver branches associated with the one or more antenna arrays of the UE.

Figure 10:
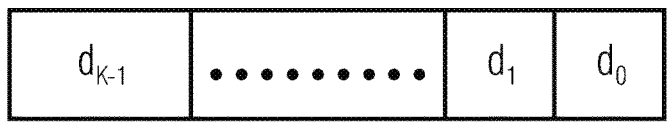
FIG. 10 is a schematic representation of a bitmap as it may be used in accordance with embodiments of the present invention.

FIG. 10 is a schematic representation of a bitmap as it may be used in accordance with embodiments of the present invention. In the embodiment of FIG. 10, it is assumed that the beam report includes the K strongest DL transmission beams received and determined at the UE at step "4" in FIG. 9. The bitmap, therefore, may be a K-length bitmap $d_{K-1} \ldots d_1, d_0$, where $d_0$ is the least significant bit, LSB, and the value of "1" for $d_k$ indicates that for the k-th reported beam a beam correspondence exists.

In accordance with embodiments, the bitmap reporting may be included into the CSI report as a reporting quantity or, in accordance with other embodiments, the bit reporting may be a UE capability meaning that the bitmap needs not to be configured in the CSI but may be used and reported by the UE by default. For example, a reporting quantity in the CSI report may be extended so that responsive to this extension, the UE reports the K strongest beams obtained by measurements along with the bitmap. For example, the higher layer parameter ReportQuantity provided in the CSI-ReportConfig, as is indicated in reference [6], may be extended and configured with "CRI/RSRP/BC-BMP" or "SSB-Index/RSRP/BC-BMP" so that the UE may report the strongest beams by measuring the CSI-RS or the SSB/PBCH resources as indicated by the higher layer parameter together with the bitmap BC-BMP. In accordance with embodiments in which the bitmap reporting is performed by default, the respective report configuration need not be amended, and responsive to receiving the CSI-ReportConfig as it is specified in reference [6], for example, which indicates only CRI/RSRP or SSB-Index/RSRP, the UE reports the K strongest beams obtained by measuring the CSI-RS or SSB/

PBCH resources as indicated by the higher layer parameters and, automatically, also sends the bitmap indicating the beam correspondence.

Beam Correspondence Signaling for Uplink Beam Sweeping

In accordance with further embodiments of the present invention, a UE may be configured by the gNB to perform a beam sweep procedure to identify one or more suitable uplink transmission beams.

Figure 11:
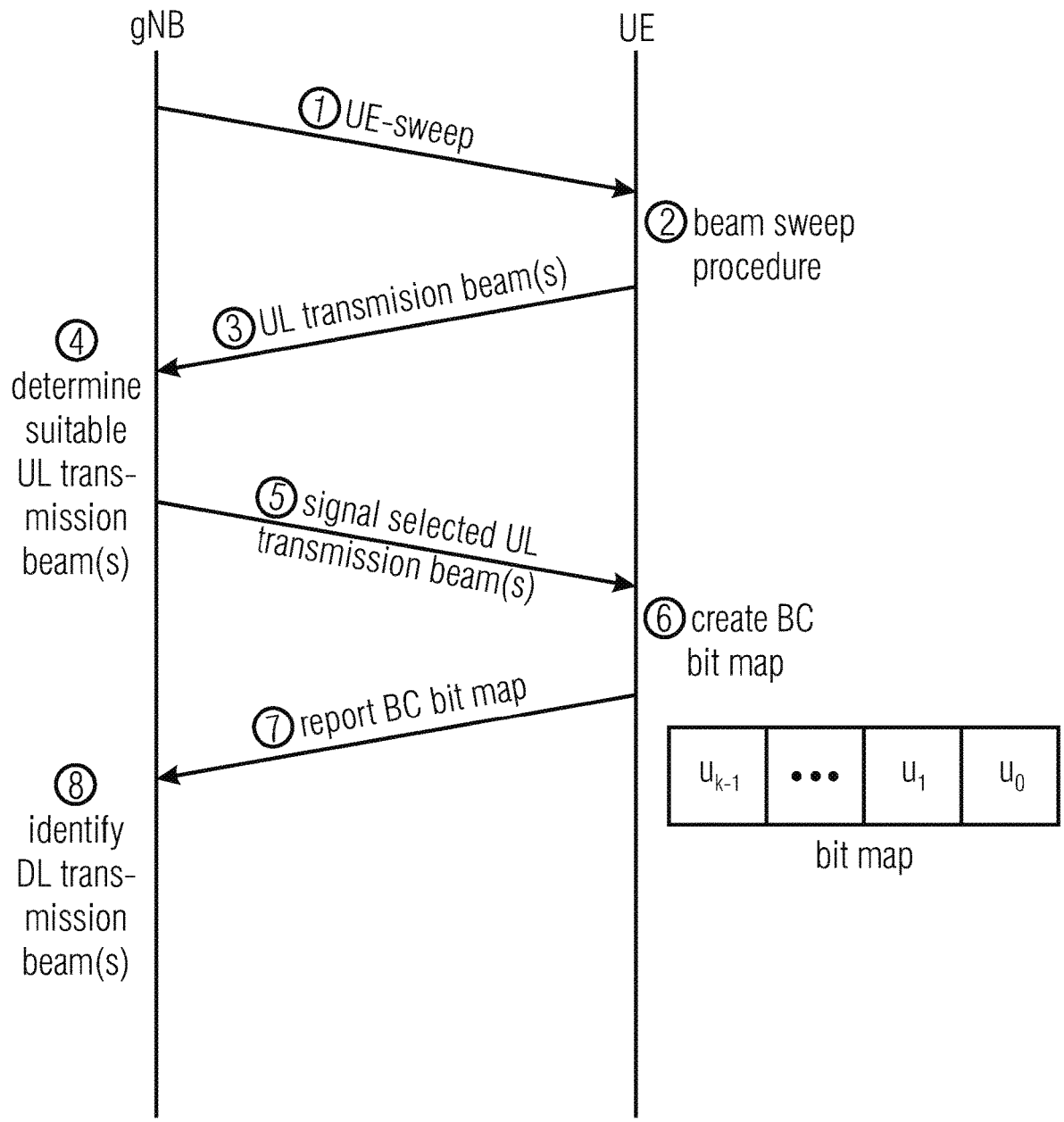
FIG. 11 illustrates the beam correspondence signaling for uplink beam sweeping in accordance with embodiments of the present invention.

FIG. 11 illustrates the beam correspondence signaling for uplink beam sweeping in accordance with embodiments of the present invention. The gNB and the UE may be structured as described above with reference to FIGS. 5 to 8.

In accordance with an embodiment, at step "1" in FIG. 11, the gNB signals to the UE to perform a beam sweep procedure using, for example, a higher or physical layer parameter UE-sweep. Responsive to receiving the UE-sweep signaling the UE performs a beam sweeping operation of UL transmission beams, e.g., in different directions, as is indicated at step "2". Thus, the beam sweep procedure may cause the transmission of UL transmission beams into different spatial directions as indicated at step "3". For example, the UE may transmit a first UL transmission beam in a first direction, a second UL transmission beam in a second direction, a third UL transmission beam in a third direction and so on. The UL transmission beams may be time division multiplexed in different symbol periods, subcarriers or slots of a sub-frame. The beams may also be frequency division multiplexed. The pilots may be time or frequency or code division multiplexed as stated in Rel. 15. Each UL transmission beam may be associated with a certain UL RS, which may be a sounding reference signal, a demodulation reference signal or a random access sequence or any other pilot signal so as to allow the gNB to determine and evaluate the received UE UL transmission beams. The UL transmission beams are received at the gNB, and the gNB, at step "4", determines or selects a suitable UL transmission beam for the uplink transmission. The gNB may identify one or more UL reception beams which are associated with one or more of the UL transmission beams provided by the UE based on measurements on the received uplink beam-formed RSs. At step "5" the gNB signals to the UE the one or more identified UL transmission beam(s). At step "6" the UE creates or generates for the one or more UL transmission beams indicated by the gNB at step "5" a beam correspondence bitmap. The beam correspondence bitmap may be created as described in the above described embodiments and may have a set of binary flags, each flag indicating if for a UL transmission beam a beam correspondence with a DL reception exists or not. The beam correspondence bitmap is reported to the gNB at step "7", and at step "8" the gNB, responsive to the received identifies one or more associated DL transmission beams for the DL transmission to the UE. The beam map may be similar to the bitmap of FIG. 10 and, in case K UE UL transmission are reported, a K-length bit map $u_{k-1} \ldots u_1, u_0$ may be transmitted, where $u_0$ is the LSB, and a value of "1" for $u_k$ indicates that for the k-th reported UL transmission beam, a beam correspondence exists with a reception beam at the UE in the downlink.

The present invention is not limited to the above described embodiment using the bitmap for signaling the beam correspondence. Other embodiments may not employ a bitmap.

Figure 12:
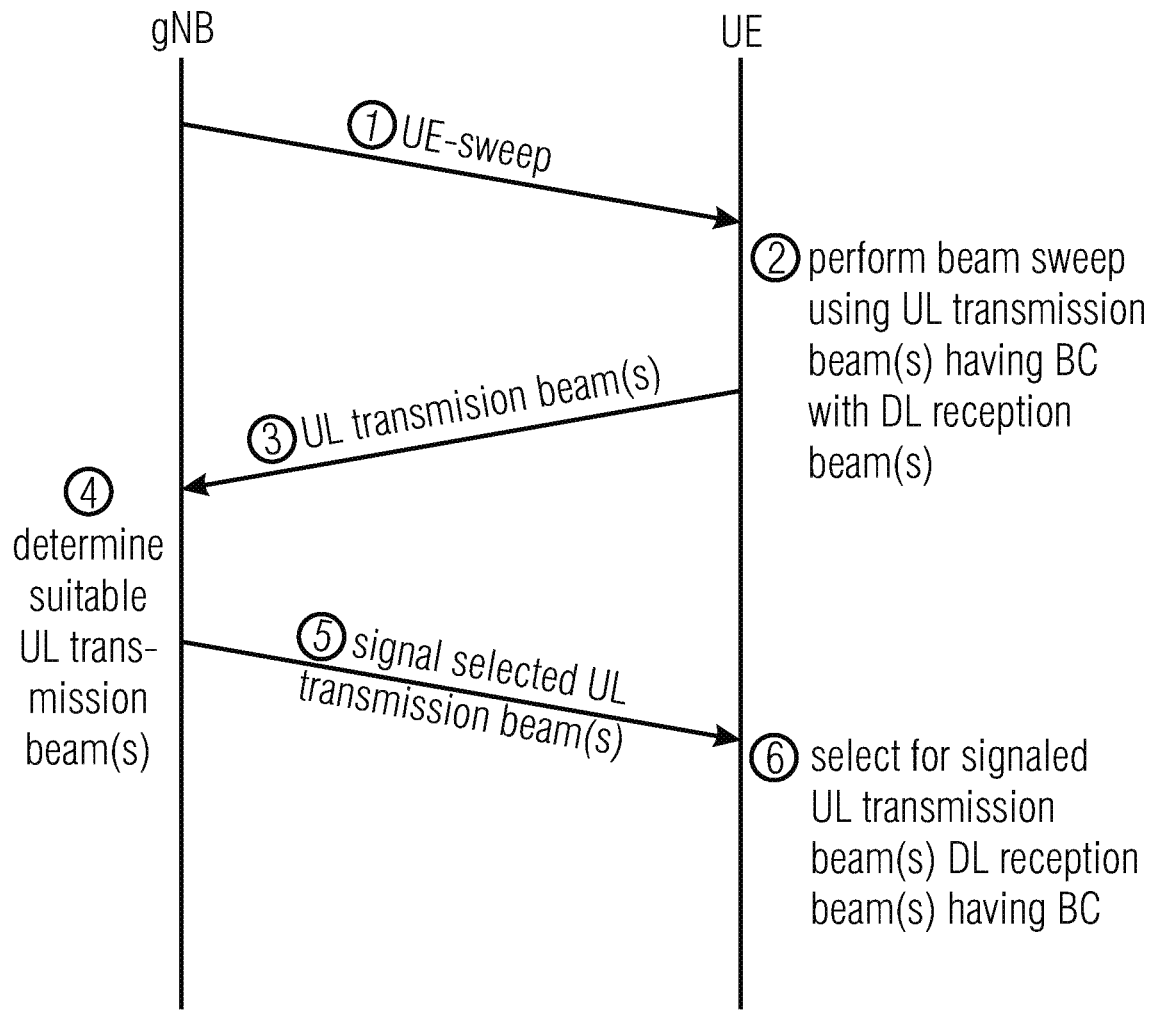
FIG. 12 illustrates the beam correspondence signaling for uplink beam sweeping in accordance with embodiments of the present invention not employing a bit map.

FIG. 12 illustrates the beam correspondence signaling for uplink beam sweeping in accordance with embodiments of the present invention not employing a bit map.

At step "1" in FIG. 12, the gNB signals to the UE to perform a beam sweep procedure using, for example, a higher or physical layer parameter UE-sweep or UE-Beam-Sweep. In case the gNB has knowledge about the beam correspondence capabilities of the UE, which may be signaled from the UE to the gNB when connecting to the gNB for the first time, the UE-sweep signal may also indicate the UL transmission beams, which may be generated at the UE, are to be used for the beam sweeping procedure, for example such UL transmission beams for which the UE is capable of providing beam correspondence. Each UL transmission beam is represented by one UE transmit, Tx, beam, or a combination of a plurality of UE Tx beams, and each UE Tx beam associated with or formed by one or more antenna arrays.

Responsive to receiving the UE-sweep signaling the UE performs at step "2" a beam sweeping operation of UL transmission beams, e.g., in a way as described above with reference to FIG. 11, to cause the transmission of UL transmission beams as is indicated at step "3". The UE, at step "2" may use only those UL transmission beams in the beam sweep procedure for which an associated DL reception beam exists. As described above, e.g., with reference to FIG. 8, a DL reception beam is represented by one UE receive, Rx, beam, or a combination of a plurality of UE Rx beams, and each UE Rx beam is associated with or formed by one or more antenna arrays.

The UL transmission beams are received at the gNB, and the gNB, at step "4", determines or selects a suitable UL transmission beam for the uplink transmission. At step "5" the gNB signals to the UE the one or more identified UL transmission beams.

At step "6" the UE determines or generates, using the UE's antenna arrays, one or more DL reception beams for a downlink reception corresponding to the signaled UL transmission beams. The DL reception beam(s) generated may be selected from those DL reception beams identified at step "2" to have BC with the UL transmission beams transmitted at step "3".

Beam Correspondence Indication in UL Beam Report to gNB

In accordance with other embodiments of the present invention, the UE may be configured by the gNB to perform a beam sweep procedure so as to identify one or more suitable uplink transmission beams at the gNB.

Figure 13:
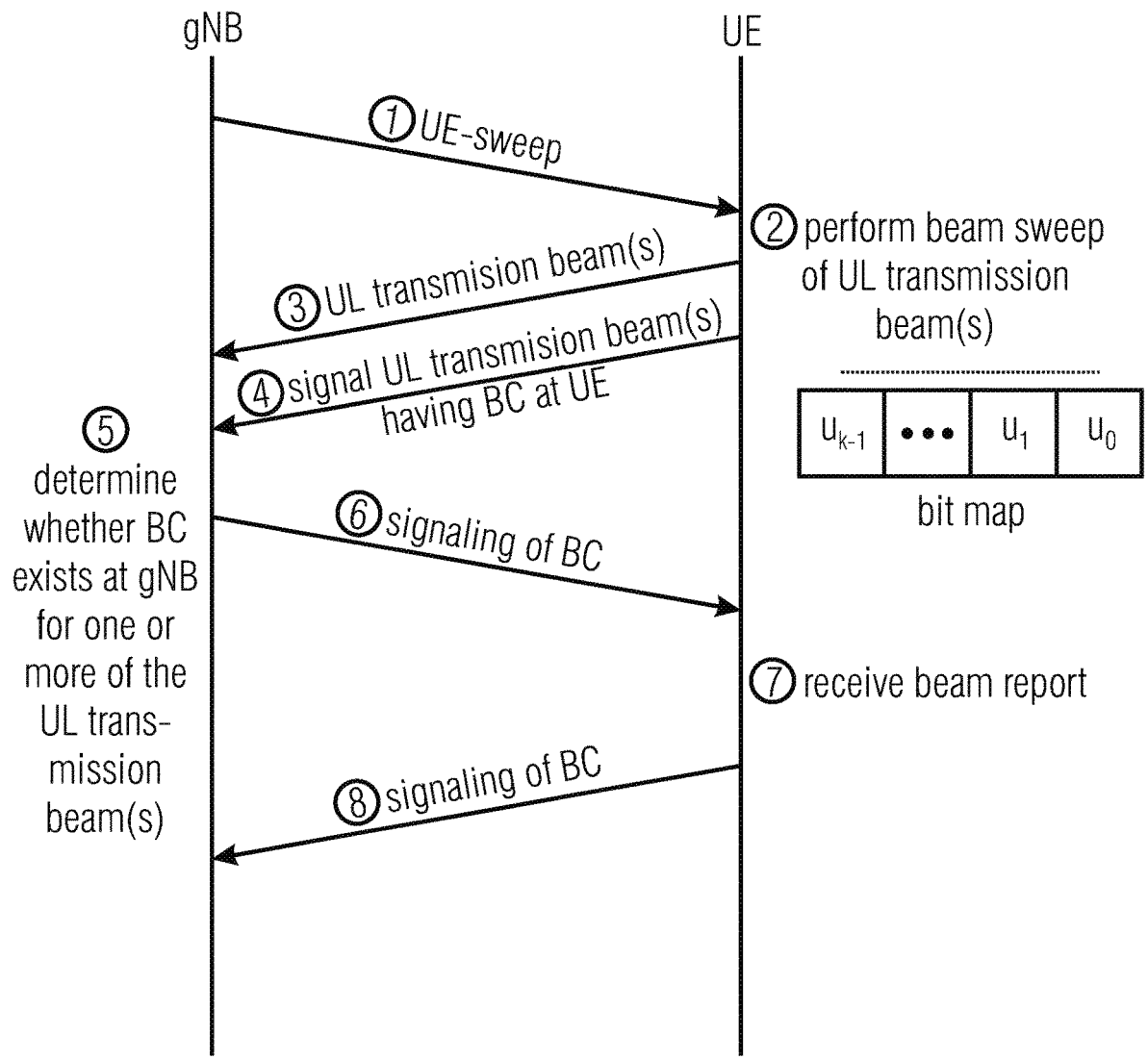
FIG. 13 illustrates an embodiment for implementing beam correspondence indication in a UL beam report to the gNB.

FIG. 13 illustrates an embodiment for implementing beam correspondence indication in a UL beam report to the gNB. Initially, at step "1", the gNB signals to the UE to perform a beam sweep procedure using, for example, a higher or physical layer parameter UE-sweep.

Responsive to receiving the UE-sweep signaling the UE performs at step "2" a beam sweeping operation of UL transmission beams, e.g., in a way as described above with reference to FIG. 11, to cause the transmission of UL transmission beams as is indicated at step "3". The UE, at step "2" may use any UL transmission beam that may be generated by the UE's antenna arrays, regardless of whether beam correspondence, partial beam correspondence or no beam correspondence with a DL transmission beam exists.

Further, at step "2" the UE may determine for the UL transmission beams transmitted at step "3" those UL transmission beams having associated therewith a DL reception beam at the UE, and at step "4" the UE provides an indication which of the UL transmission beams generated by the beam sweep procedure has an associated DL reception beam at the UE.

The UL transmission beams are received at the gNB, and the gNB, at step "5", determines or decides if beam correspondence at the BS is established, which may be signaled to the UE at step "6". In case BC cannot be established for any of the received UL transmission beams, the gNB may initiate a DL beam sweeping procedure, e.g., a process as described with reference to FIG. 9 may be started.

In accordance with embodiments, at step "5" the gNB may create a beam report, which indicates to the UE the UL transmission beams suitable for an UL transmission, and which is signaled to the UE at step "6". Responsive to the receipt of the beam report at step "7", the UE may provide, at step "8" a beam correspondence indication for the UL transmission beams in the received report. Determining the BC and indicating the BC to the gNB may be done in a way as described in the embodiments of FIG. 9 or FIG. 11.

In accordance with other embodiments, at step "2" the UE may determine a beam correspondence bitmap for the one or more UE UL transmission beams transmitted at step "3", e.g., a bitmap as described above with reference to FIG. 10 or with reference to FIG. 11. The beam correspondence bitmap includes a set of binary flags, each flag indicating if for the one or more transmit beams a beam correspondence exists or not. A beam correspondence exists, if the UE is able to determine at least one UE DL reception beam for the DL reception, and no beam correspondence exists, if the UE is not able to determine a UE DL reception beam for the DL reception. At step "4" the beam correspondence bitmap may be signaled or reported to the gNB.

Figure 14:
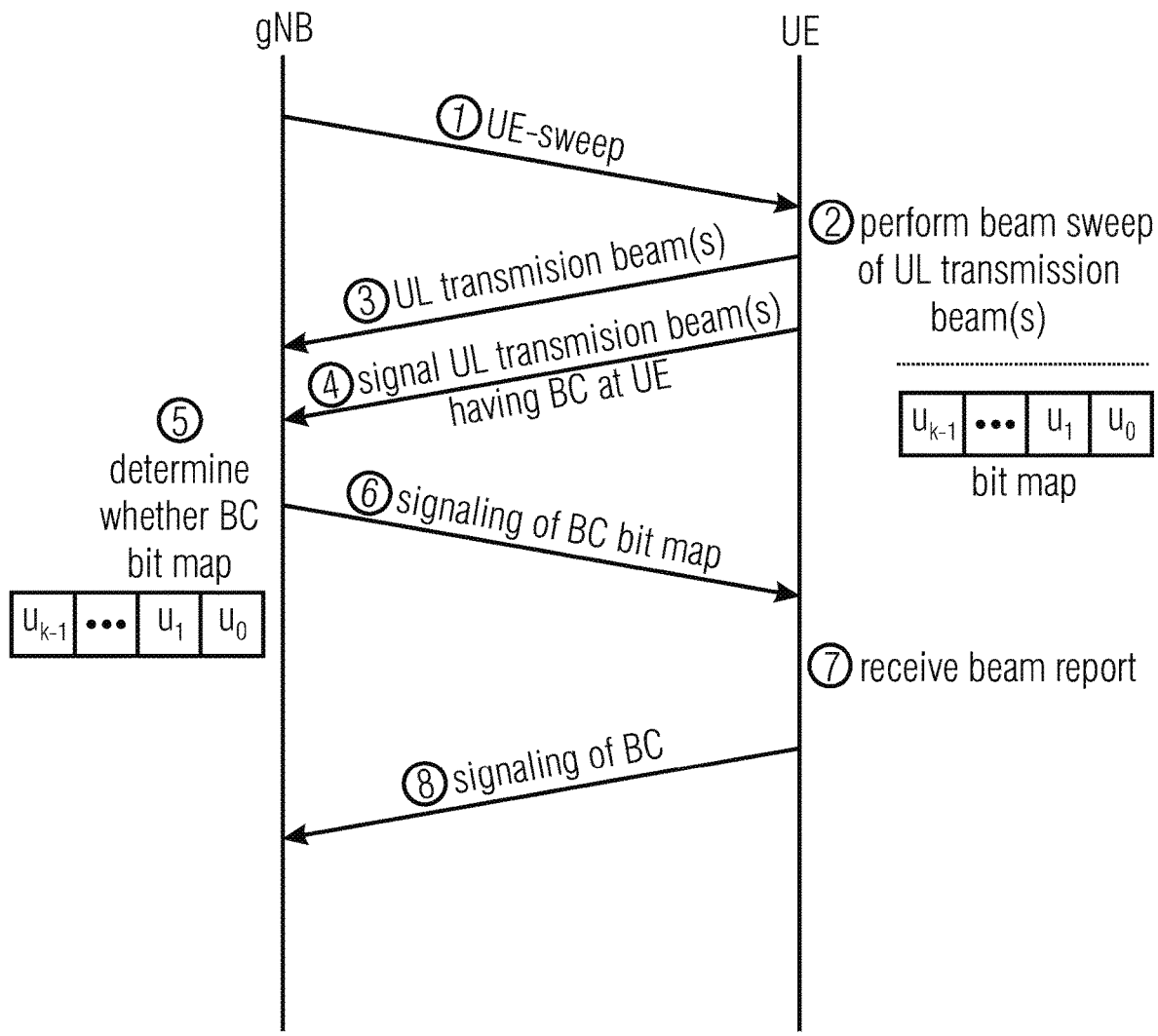
FIG. 14 illustrates a further embodiment for implementing beam correspondence indication in a UL beam report to the gNB employing a bitmap.

FIG. 14 illustrates a further embodiment for implementing beam correspondence indication in a UL beam report to the gNB, the gNB determines a beam correspondence bitmap for signaling to the UE. In FIG. 14 steps "1" to "4" and "7" to "8" correspond to the steps described above with reference to FIG. 13. Other than in the embodiment of FIG. 13, at step "5" the gNB determines a beam correspondence bitmap which may be signaled to the UE at step "6" and indicates to the UE the UL transmission beams suitable for an UL transmission. The beam correspondence bitmap may include a set of binary flags, each flag indicating if for an indicated UL transmission beam a beam correspondence in the DL exists or not. The beam correspondence bitmap may be a bitmap as described above with reference to FIG. 10 or with reference to FIG. 11.

In the embodiments described so far, it had been assumed that, once a suitable UL transmission beam is determined, the UE will use the determined or selected UL transmission beam for the UL communication with the gNB.

Selective Use of a Selected Uplink Transmission Beam

Further embodiments of the present invention provide an approach for dealing with a situation in which the selected UL transmission beam may not be used. For instance, there may be certain regulatory requirements that need to be observed or there may be certain constraints. An example for such a regulatory requirement may be that the selected UL transmission beam may not be transmitted towards to head of the user or operator of the UE. Other examples for a regulatory requirement or constraints my apply.

For example, although the initially selected UL transmission beam may provide for a communication having desired properties, the regulatory requirement may involve that another UL transmission beam, e.g., directed away from the user's head, is selected and used for the communication to the gNB. The other or newly selected UL transmission beam may provide for a communication having properties degraded when compared to the desired properties of the initial UL transmission beam. For example, the initial beam may provide for a line-of-sight, LOS, transmission to the gNB, while the other beam may provide for a non-line-of-sight, NLOS, transmission to the gNB.

Figure 15:
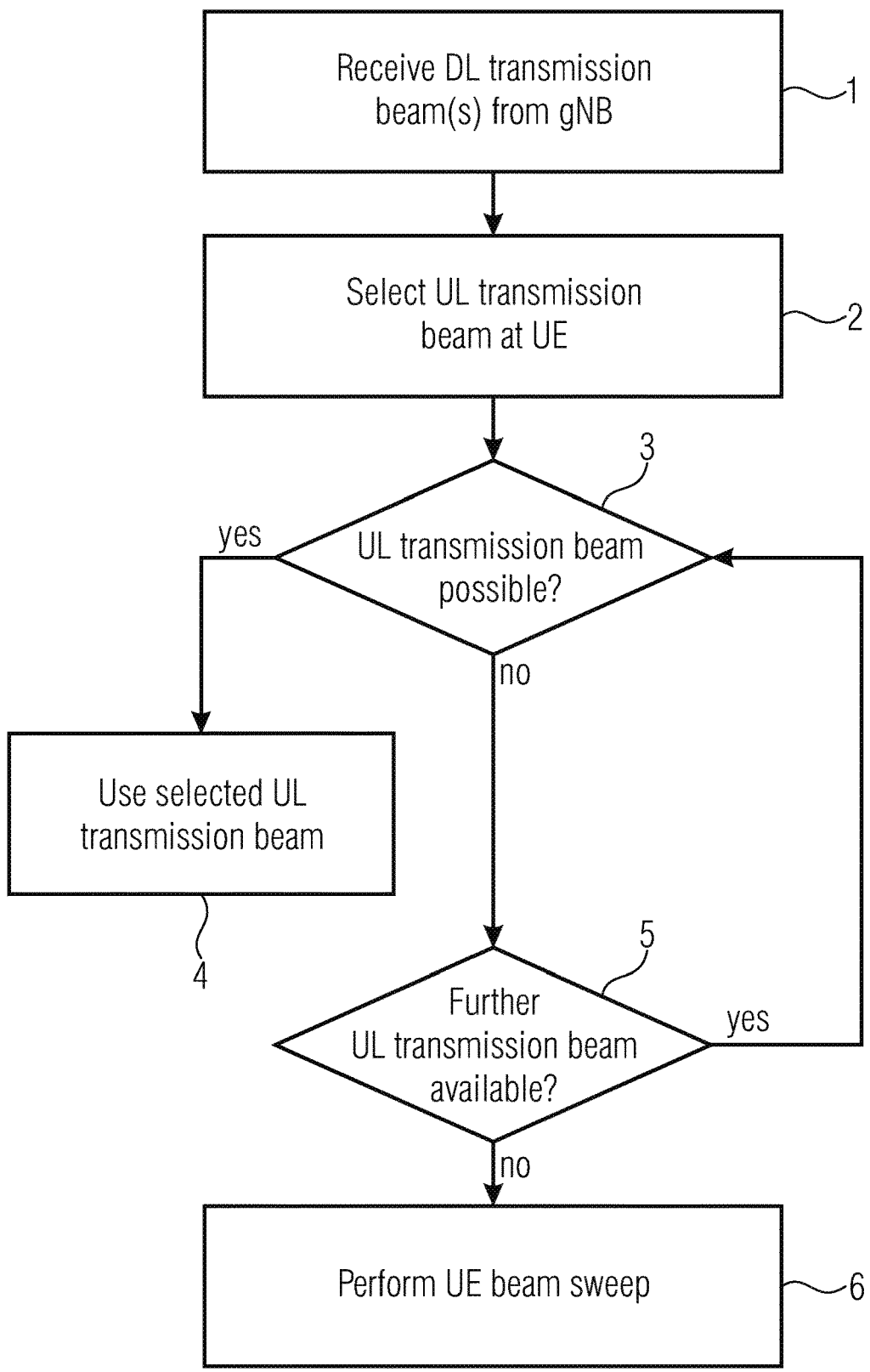
FIG. 15 illustrates a flow diagram of an embodiment of the present invention dealing with the possibility to use an UL transmission beam that has been selected at the UE to regulatory requirements or other constraints.

FIG. 15 illustrates a flow diagram of an embodiment of the present invention dealing with an UL transmission beam that has been selected at the UE responsive to receiving one or more DL transmission beams from the gNB and that, e.g., due to regulatory requirements or other constraints may not be used.

In FIG. 15, the UE receives at step "1" one or more DL transmission beams from the gNB.

At step "2" the UE selects a suitable UL transmission beams for the UL communication with the gNB. At step "2", the UE determines, e.g., in a way as described in steps "1" to "4" of the embodiment of FIG. 9 above, one or more DL reception beams for the received DL transmission beams and determines one or more UL transmission beams to be used at the UE. In accordance with other embodiments, the UE may determine the UL transmission beams in a way as described in steps "1" to "5" of the embodiment of FIG. 11, or as described in steps "1" to "5" of the embodiment of FIG. 12 above, or as described in steps "1" to "6" of the embodiments of FIG. 13 and FIG. 14.

It is noted, that this embodiment is not limited to the use of UL transmission beams for which beam correspondence with a DL transmission beam exists, rather the UE may determine the UL transmission beams regardless of whether beam correspondence, partial beam correspondence or no beam correspondence with a DL transmission beam exists. In other words, also UL transmission beams for which no beam correspondence with a DL transmission beam exists may be selected as step "2".

Following the selection of an UL transmission beam at step "2", it is determined at step "3" whether the selected UL transmission beam may be actually used or whether certain regulatory requirements or constraints do not allow using the selected UL transmission beam. In case it is determined that there are no regulatory requirements or constraints prohibiting the use of the selected UL transmission beam, the process proceeds to step "4" and the selected UL transmission beam is used for the UL communication with the gNB.

On the other hand, there may be regulatory requirements or constraints prohibiting the use of the selected UL transmission beam. For example, as mentioned above, in case the selected UL transmission beam is transmitted towards to head of the user or operator of the UE it is determined at step "3" that the selected UL transmission beam may not be used, and the process proceeds to step "5" where it may be determined whether a further UL transmission beam is available. If yes, the process returns to step "3", and in case it is determined that the newly selected UL transmission beam may be used, the process proceeds to step "4".

In accordance with further embodiments, in case here is no other UL transmission beam available at step "5", the process may proceed to step "6" and a UE beam sweep procedure may be performed, e.g., in a way as described in steps "11" to "14" of the embodiment of FIG. 9 or as described in the embodiments of FIG. 11 to FIG. 14 so as to determine one or more other UL transmission beams suitable for a communication from the UE to the gNB.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator.

In accordance with embodiments, the base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

The embodiments of the present invention have been described above with reference to a communication system in which a base station and a user equipment communicate. However, the present invention is not limited to such embodiments and may also be implemented in a communication system in which two or more UEs communicate directly with each other, e.g., via a sidelink interface. In such embodiments, the base station is formed or implemented by a UE.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 16 illustrates an example of a computer system 300. The units or modules as well as the steps of the methods performed by these units may execute on one or more computer systems 300. The computer system 300 includes one or more processors 302, like a special purpose or a general purpose digital signal processor. The processor 302 is connected to a communication infrastructure 304, like a bus or a network. The computer system 300 includes a main memory 306, e.g., a random access memory (RAM), and a secondary memory 308, e.g., a hard disk drive and/or a removable storage drive. The secondary memory 308 may allow computer programs or other instructions to be loaded into the computer system 300. The computer system 300 may further include a communications interface 310 to allow software and data to be transferred between computer system 300 and external devices. The communication may be in the from electronic, electromagnetic, optical, or other signals capable of being handled by a communications interface. The communication may use a wire or a cable, fiber optics, a phone line, a cellular phone link, an RF link and other communications channels 312.

The terms "computer program medium" and "computer readable medium" are used to generally refer to tangible storage media such as removable storage units or a hard disk installed in a hard disk drive. These computer program products are means for providing software to the computer system 300. The computer programs, also referred to as computer control logic, are stored in main memory 306 and/or secondary memory 308. Computer programs may also be received via the communications interface 310. The computer program, when executed, enables the computer system 300 to implement the present invention. In particular, the computer program, when executed, enables processor 302 to implement the processes of the present invention, such as any of the methods described herein. Accordingly, such a computer program may represent a controller of the computer system 300. Where the disclosure is implemented using software, the software may be stored in a computer program product and loaded into computer system 300 using a removable storage drive, an interface, like communications interface 310.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein are apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user equipment, UE, for communicating with a base station, BS, in a wireless communication system,
   wherein the UE comprises one or more antenna arrays, each antenna array comprising a plurality of antenna elements,
   wherein the UE is configured to:
   receive one or more downlink, DL, transmission beams from the BS;
   select an uplink, UL, transmission beam for the UL communication with the BS,
   determine whether one or more certain regulatory requirements or constraints prohibit the use of the selected UL transmission beam,
   in case there are no regulatory requirements or constraints prohibiting the use of the selected UL transmission beam, use the selected UL transmission beam for the UL communication with the BS,
   in case there are regulatory requirements or constraints prohibiting the use of the selected UL transmission beam, select for the UL communication with the BS another UL transmission beam for which no regulatory requirements or constraints exist, and
   receive from the BS a control signal so as to initiate at the UE a process for determining one or more DL reception beams, wherein the control signal includes a signaling that during a determination of the DL reception beams only those DL reception beams are to be considered, for which corresponding beams in the UL transmission exist.

2. The UE of claim 1, wherein the UE is configured to:
   receive from the BS a control signal causing the UE to send to the BS a beam report indicating the DL reception beams, a DL reception beam being associated with a DL transmission beam from the BS, and
   signal in addition to the beam report a beam correspondence bitmap, the beam correspondence bitmap comprising a set of binary flags, each flag indicating if for a reported DL reception beam an UL transmission beam exists or not.

3. The UE of claim 1, wherein the UE is configured to:
   determine a first quality or strength for a reported DL reception beam using a set of UE Rx beams determined for the reported DL reception beam, wherein for each UE Rx beam in the set a UE Tx beam for forming the UL transmission beam may exist or not exist,
   determine a second quality or strength for the reported DL reception beam using the UE Rx beams out of the set of UE Rx beams for which UE Tx beams for forming the UL transmission beam exist, and
   indicate via a flag that an UL transmission beam exists if the first quality or strength reduced by the second quality or strength is below a first threshold value, or if the ratio of the first quality or strength and the second quality or strength is below a second threshold value.

4. The UE of claim 1, wherein the UE is configured to:
   signal to a BS, dependent on a property of the one or more antenna arrays, whether the UE supports full beam correspondence, partial beam correspondence or no beam correspondence.

5. The UE of claim 4, wherein
   responsive to a plurality of BS downlink, DL, transmission beams transmitted by the BS, the UE is configured to:
   determine one or more DL reception beams,
   each DL reception beam is associated with a DL transmission beam from the BS, the DL reception beam being represented by an UE receive, Rx, beam or by a combination of a plurality of UE Rx beams, wherein each UE Rx beam is formed by one or more of the antenna arrays, and
   in case of full beam correspondence with an uplink, UL, transmission, the UE identifies for each determined DL reception beam an associated UL transmission beam, the UL transmission beam being represented by an UE transmit, Tx, beam or by a combination of a plurality of UE Tx beams, wherein each UE Tx beam is formed by one or more of the antenna arrays,
   in case of no beam correspondence with the UL transmission, the UE does not identify for any of the DL reception beams an associated UL transmission beam, and
   in case of partial beam correspondence with the UL transmission, the UE identifies for a DL reception beam an UL transmission beam being represented by a plurality of UE Tx beams, wherein for a first set of the UE Rx beams the UE does not identify an associated UL transmission beam being represented by an UE transmit, Tx, beam or by a combination of a plurality of UE Tx beams so that a beam correspondence does not exist, and for a second set of the UE Rx beams the UE identifies an associated UL transmission beam being represented by an UE transmit, Tx, beam or by a combination of a plurality of UE Tx beams so that a beam correspondence exists.

6. The UE of claim 4, wherein
   responsive to a plurality of BS downlink, DL, transmission beams transmitted by the BS, the UE is configured to:
   determine one or more DL reception beams,
   each DL reception beam is associated with a DL transmission beam from the BS, the DL reception beam being represented by an UE receive, Rx, beam or by a combination of a plurality of UE Rx beams, wherein each UE Rx beam is formed by one or more of the antenna arrays, and
   in case of full beam correspondence with an uplink, UL, transmission, the UE identifies for each determined DL reception beam an associated UL transmission beam, the UL transmission beam being represented by an UE transmit, Tx, beam or by a combination of a plurality of UE Tx beams, wherein each UE Tx beam is formed by one or more of the antenna arrays, in case of no beam correspondence with the UL transmission, the UE does not identify for any of the DL reception beams an associated UL transmission beam, and in case of partial beam correspondence with the UL transmission, the UE identifies for a first DL reception beam an associated UL transmission beam so that beam correspondence exists, and the UE does not identify for a second DL reception beam an associated UL transmission beam so that beam correspondence does not exist.

7. The UE of claim 5, wherein
the UE is configured to:
transmit a plurality of UL transmission beams, and
identify the one or more DL reception beams responsive
to a signaling from the BS indicating the UL transmission beams which are received at the BS, wherein in case of full beam correspondence with a DL transmission, the UE identifies for an indicated UL transmission beam an associated DL reception beam, and in case of no beam correspondence with the DL transmission, the UE does not identify for an indicated UL transmission beam an associated DL reception beam.

8. The UE of claim 4, wherein the UE is configured to: signal full beam correspondence if the UE supports beam correspondence with the UL transmission and/or the UE supports beam correspondence with the DL transmission, no beam correspondence if the UE supports no beam correspondence with the UL transmission and the UE supports no beam correspondence with the DL transmission, and partial beam correspondence if the UE supports partial beam correspondence with the UL transmission.

9. The UE of claim 4, wherein an UL transmission beam and a DL reception beam are associated with each other so as to provide a beam correspondence in case the UL transmission beam and the DL transmission beam share at least a subset of predefined beam properties, the subset of predefined beam properties comprising one or more of beam direction, like an angle of arrival or an angle of departure, beam width, like a UE Tx beam width being equal to or smaller than an UE Rx beam width, a correlation value, like a full correlation or a correlation above a defined value/threshold, and beam shape.

10. The UE of claim 4, wherein the one or more antenna arrays comprise one or more of:

a first set of one or more antenna arrays supporting beam correspondence and comprising one or more transceive, RX/TX, arrays used for both signal reception and signal transmission, a second set of one or more antenna arrays not supporting beam correspondence and comprising one or more RX/TX arrays used for both signal reception and signal transmission, a third set of one or more antenna arrays not supporting beam correspondence and comprising one or more receive, RX, arrays used solely for signal reception, and a fourth set of one or more antenna arrays not supporting beam correspondence and comprising one or more transmit, TX, arrays used solely for signal transmission.

11. The UE of claim 10, wherein
an antenna array of the first set comprises a plurality of antenna elements which are shared for reception and transmission, or an antenna array of the first set comprises a plurality of antenna elements, wherein separate antenna elements are used for reception and transmission.

12. The UE of claim 10, comprising one or more antenna arrays solely of the first set, wherein the UE is configured to:
signal to the BS that the UE supports full beam correspondence for all of its antenna arrays.

13. The UE of claim 10, comprising one or more antenna arrays solely of the second, third or fourth sets, wherein the UE is configured to:
signal to the BS that the UE does not support beam correspondence.

14. The UE of claim 10, comprising one or more antenna arrays of the first set and one or more antenna arrays of any one of the second, third or fourth sets, wherein the UE is configured to:
signal to the BS that the UE partially supports beam correspondence.

15. A wireless communication network, comprising:
at least one base station, BS, and
at least one user equipment, UE, communicating with the at least one BS, wherein the UE comprises one or more antenna arrays, each antenna array comprising a plurality of antenna elements, and wherein the UE is configured to:

receive one or more downlink, DL, transmission beams from the BS;

select an uplink, UL, transmission beam for the UL communication with the BS, determine whether one or more certain regulatory requirements or constraints prohibit the use of the selected UL transmission beam, in case there are no regulatory requirements or constraints prohibiting the use of the selected UL transmission beam, use the selected UL transmission beam for the UL communication with the BS, and in case there are regulatory requirements or constraints prohibiting the use of the selected UL transmission beam, select for the UL communication with the BS another UL transmission beam for which no regulatory requirements or constraints exist, and receive from the BS a control signal so as to initiate at the UE a process for determining one or more DL reception beams, wherein the control signal includes a signaling that during a determination of the DL reception beams only those DL reception beams are to be considered, for which corresponding beams in the UL transmission exist.

16. The wireless communication network of claim 15, wherein the BS comprises one or more antenna arrays, each antenna array comprising a plurality of antenna elements, and the BS is configured to:
receive from the UE a signal indicating whether the UE supports beam correspondence, partial beam correspondence or no beam correspondence to a BS, dependent on a property of one or more antenna arrays at the UE.

17. The wireless communication network of claim 15, wherein
the UE comprises one or more of:
a mobile terminal, or
stationary terminal, or
cellular IoT-UE, or
an IoT device, or
a ground based vehicle, or
an aerial vehicle, or
a drone, or
a moving base station, or
road side unit, or
a building, or
any other item or device provided with network connectivity enabling the item/device to communicate using the wireless communication network, e.g., a sensor or actuator, and
the base station comprises one or more of:
a macro cell base station, or
a small cell base station, or
a road side unit, or
a UE, or
a remote radio head, or
an AMF, or
an SMF, or
a core network entity, or
a network slice as in the NR or 5G core context, or
any transmission/reception point, TRP, enabling an item or a device to communicate using the wireless communication network, the item or device being provided with network connectivity to communicate using the wireless communication network.

18. A method in a wireless communication system comprising a user equipment, UE, and a base station, BS, wherein the UE comprises one or more antenna arrays, each antenna array comprising a plurality of antenna elements, the method comprising:
receiving, at the UE, one or more DL transmission beams from the BS;
selecting an UL transmission beam for the UL communication with the BS,
determining whether one or more certain regulatory requirements or constraints prohibit the use of the selected UL transmission beam,
in case there are no regulatory requirements or constraints prohibiting the use of the selected UL transmission beam, using the selected UL transmission beam for the UL communication with the BS, and
in case there are regulatory requirements or constraints prohibiting the use of the selected UL transmission beam, selecting for the UL communication with the BS another UL transmission beam for which no regulatory requirements or constraints exist, and
receiving from the BS a control signal so as to initiate at the UE a process for determining one or more DL reception beams, wherein the control signal includes a signaling that during a determination of the DL reception beams only those DL reception beams are to be considered, for which corresponding beams in the UL transmission exist.

19. A non-transitory computer readable medium having stored thereon a computer program comprising instructions which, when executed on a computer, cause the computer to carry out a method in a wireless communication system comprising a user equipment, UE, and a base station, BS, wherein the UE comprises one or more antenna arrays, each antenna array comprising a plurality of antenna elements, the method comprising:
receiving, at the UE, one or more DL transmission beams from the BS;
selecting an UL transmission beam for the UL communication with the BS,
determining whether one or more certain regulatory requirements or constraints prohibit the use of the selected UL transmission beam,
in case there are no regulatory requirements or constraints prohibiting the use of the selected UL transmission beam, using the selected UL transmission beam for the UL communication with the BS, and
in case there are regulatory requirements or constraints prohibiting the use of the selected UL transmission beam, selecting for the UL communication with the BS another UL transmission beam for which no regulatory requirements or constraints exist, and
receiving from the BS a control signal so as to initiate at the UE a process for determining one or more DL reception beams, wherein the control signal includes a signaling that during a determination of the DL reception beams only those DL reception beams are to be considered, for which corresponding beams in the UL transmission exist.

* * * * *